United States Patent
Ono

(10) Patent No.: US 10,110,799 B2
(45) Date of Patent: Oct. 23, 2018

(54) IMAGING DEVICE INCLUDING A FOCUS ADJUSTMENT UNIT AND A FOCUS CONTROLLER FOR ADJUSTING ACTUATORS, AND IMAGING METHOD

(71) Applicant: FUJIFILM Corporation, Tokyo (JP)

(72) Inventor: Shuji Ono, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/432,324

(22) Filed: Feb. 14, 2017

(65) Prior Publication Data

US 2017/0155821 A1    Jun. 1, 2017

Related U.S. Application Data

(63) Continuation of application No. PCT/JP2015/071354, filed on Jul. 28, 2015.

(30) Foreign Application Priority Data

Aug. 29, 2014  (JP) ................ 2014-175442

(51) Int. Cl.
  *H04N 5/232*  (2006.01)
  *G02B 7/28*  (2006.01)
  *G02B 7/09*  (2006.01)

(52) U.S. Cl.
  CPC ......... *H04N 5/23212* (2013.01); *G02B 7/09* (2013.01); *G02B 7/285* (2013.01)

(58) Field of Classification Search
  CPC ......... H04N 5/23212; H04N 5/23216; H04N 5/23296; G02B 7/285; G02B 7/09; G02B 15/00; G02B 7/282

(Continued)

(56) References Cited

U.S. PATENT DOCUMENTS 4,235,508 A * 11/1980 Kaprelian .......... G02B 17/0808
                                                   359/366
4,354,742 A * 10/1982 Abel .................. G02B 17/0808
                                                   359/648

(Continued)

FOREIGN PATENT DOCUMENTS

JP    2003-270526 A    9/2003
JP    2007-122055 A    5/2007

(Continued)

OTHER PUBLICATIONS

International Search Report issued in PCT/JP2015/071354; dated Oct. 13, 2015.

(Continued)

*Primary Examiner* — Albert Cutler
(74) *Attorney, Agent, or Firm* — Studebaker & Brackett PC

(57) ABSTRACT

An imaging device includes an imaging optical system that includes a first optical system and a second optical system having independent characteristics; an imaging element that includes plural light-receiving sensors that pupil-split light passed through a corresponding optical system among the first optical system and the second optical system to receive the light; an image generation unit that generates a first captured image from an imaging signal output from the light-receiving sensors corresponding to the first optical system and generates a second captured image from an imaging signal output from the light-receiving sensors corresponding to the second optical system; a focus adjustment unit that adjusts a focus state of each of the first optical system and the second optical system in an independent manner; and a focus controller that controls the focus adjustment unit based on importance degree information.

12 Claims, 20 Drawing Sheets

(58) Field of Classification Search
USPC ........ 348/240.99, 240.3, 345, 347, 349, 350
See application file for complete search history.

(56) References Cited

U.S. PATENT DOCUMENTS

| | | | |
|---|---|---|---|
| 6,734,911 B1* | 5/2004 | Lyons | G01S 3/781 |
| | | | 348/169 |
| 6,870,690 B1* | 3/2005 | Lawson | G02B 3/10 |
| | | | 359/721 |
| 7,231,069 B2* | 6/2007 | Nahata | G06K 9/00597 |
| | | | 382/117 |
| 2004/0264013 A1* | 12/2004 | Matsuki | G02B 13/06 |
| | | | 359/871 |
| 2009/0135502 A1* | 5/2009 | Border | G02B 17/0896 |
| | | | 359/721 |

FOREIGN PATENT DOCUMENTS

| | | |
|---|---|---|
| JP | 2009-128527 A | 6/2009 |
| JP | 2011-505022 A | 2/2011 |
| WO | 2013/146506 A1 | 10/2013 |

OTHER PUBLICATIONS

Written Opinion issued in PCT/JP2015/071354; dated Oct. 13, 2015.

\* cited by examiner

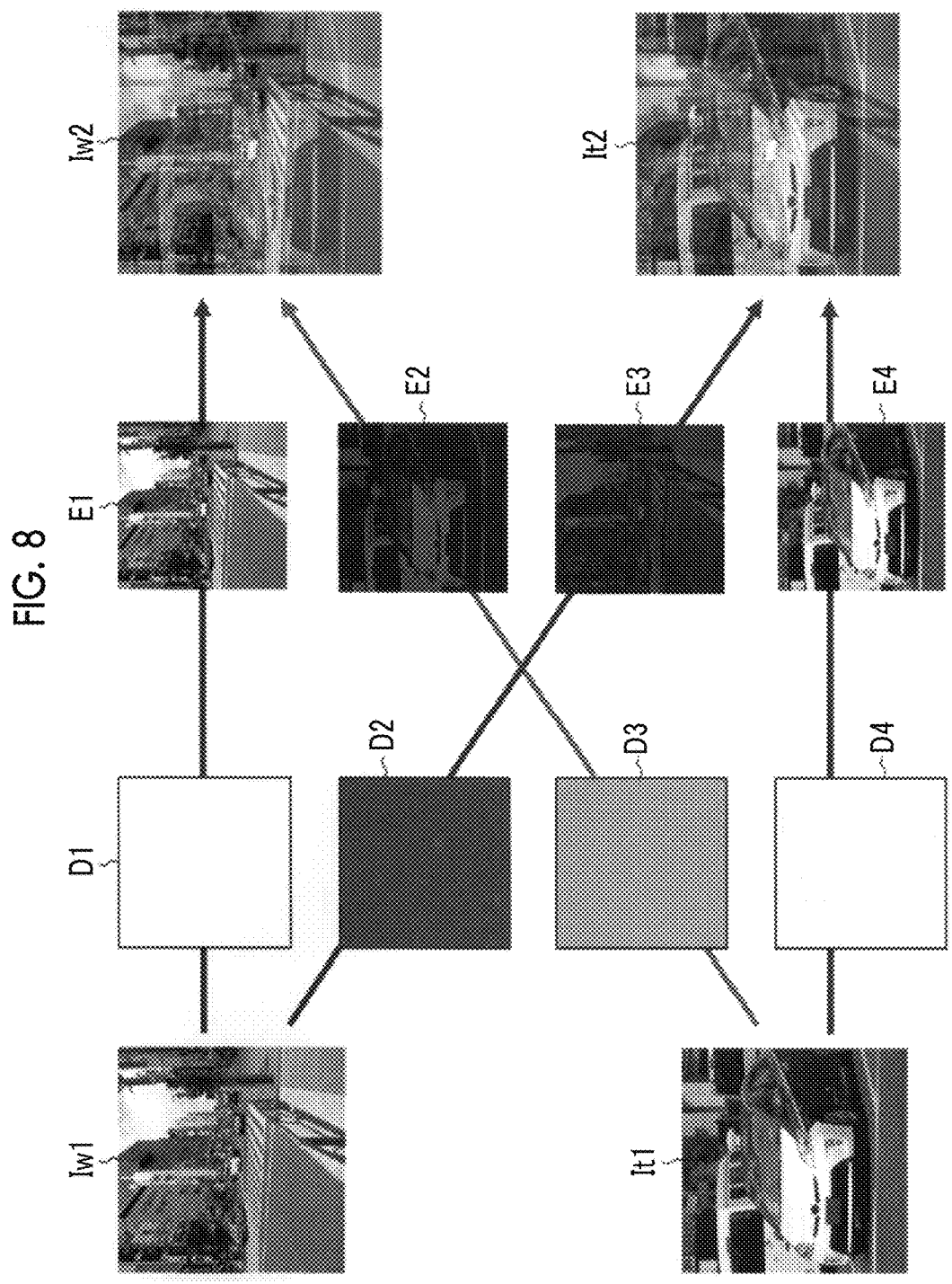

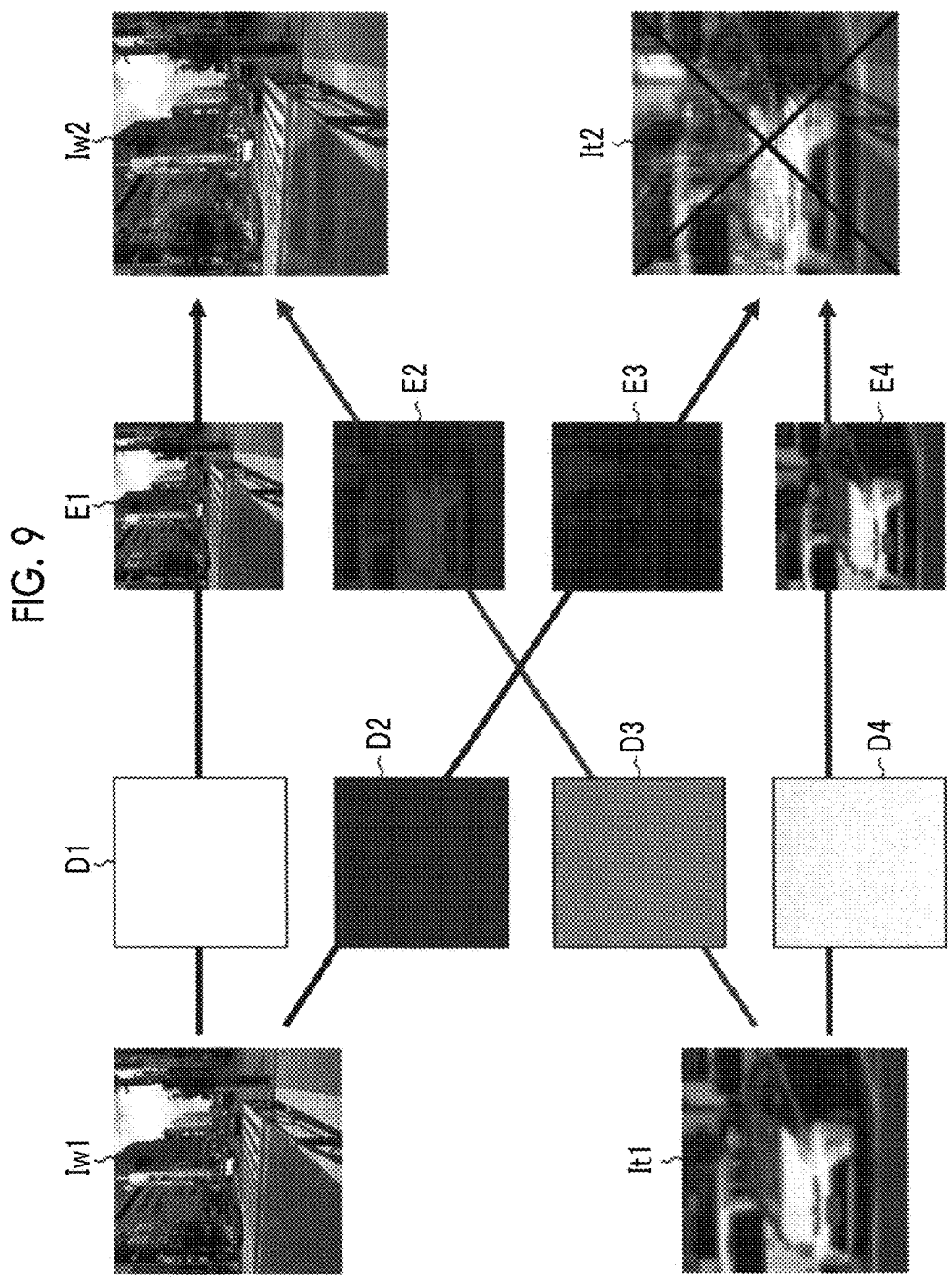

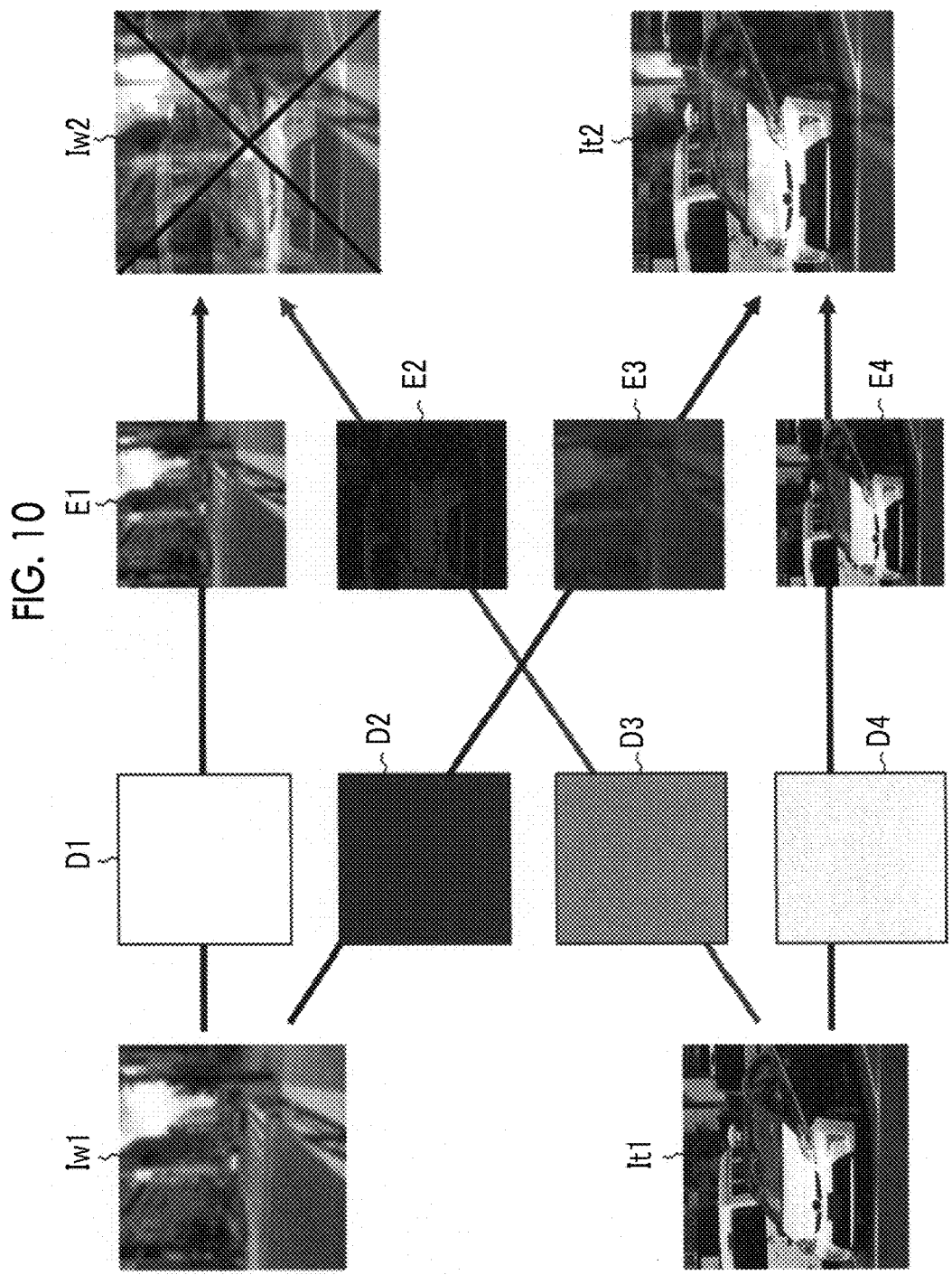

FIG. 12A
FIG. 12B
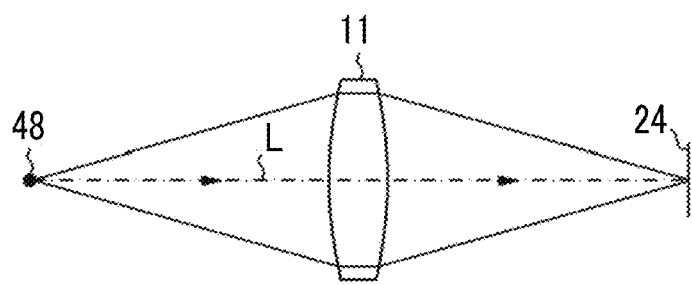
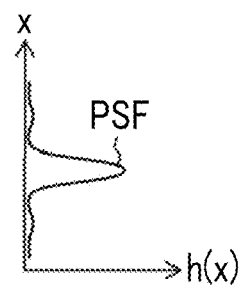
FIG. 13
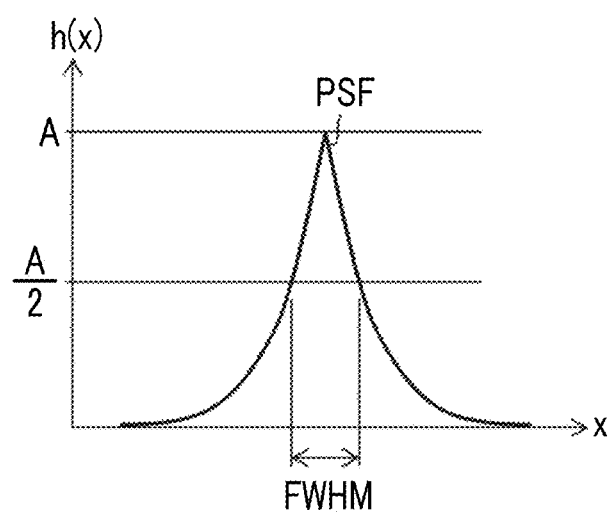

FIG. 17

$$\begin{pmatrix} W1 \\ T1 \end{pmatrix} = \begin{pmatrix} A & B \\ C & D \end{pmatrix}^{-1} \!\!\overset{M^{-1}}{*} \begin{pmatrix} W2 \\ T2 \end{pmatrix}$$

FIG. 18

$$W1 = \begin{pmatrix} w1\_11 & w1\_12 & w1\_13 & \\ w1\_21 & w1\_22 & & \\ w1\_31 & & \ddots & \\ & & & w1\_mn \end{pmatrix}$$

FIG. 19

$$w1\_ij = \frac{dij \cdot w2\_ij - bij \cdot t2\_ij}{aij \cdot dij - bij \cdot cij}$$

FIG. 20

$$t1\_ij = \frac{-cij \cdot w2\_ij + aij \cdot t2\_ij}{aij \cdot dij - bij \cdot cij}$$

IMAGING DEVICE INCLUDING A FOCUS ADJUSTMENT UNIT AND A FOCUS CONTROLLER FOR ADJUSTING ACTUATORS, AND IMAGING METHOD

CROSS-REFERENCE TO RELATED APPLICATIONS

This application is a Continuation of PCT International Application No. PCT/JP2015/071354 filed on Jul. 28, 2015, which claims priority under 35 U.S.C. § 119(a) to Japanese Patent Application No. 2014-175442 filed on Aug. 29, 2014. Each of the above applications is hereby expressly incorporated by reference, in their entirety, into the present application.

BACKGROUND OF THE INVENTION

1. Field of the Invention

The present invention relates to an imaging device and an imaging method for performing imaging using plural types of optical systems having different optical characteristics, and more particularly, to a technique that improves image quality of a captured image which deteriorates due to interference (crosstalk) of imaging light between optical systems.

2. Description of the Related Art

In the technical field of imaging devices, a technique that acquires plural types of images by performing imaging plural times while changing imaging conditions or by performing imaging using optical systems having plural characteristics is known.

For example, JP2007-122055A discloses an optical system that performs a restoration process of an image acquired by being formed on an image sensor through an imaging lens group including a multiple curvature lens having multiple curvature faces having different curvature radii and a singular curvature lens to thereby acquire images having various object distances. Further, JP2003-270526 discloses an imaging optical system that adjusts a focal distance of an overall system based on curvatures of an inner region and an outer region of a used lens, and an area on an incidence pupil plane to thereby image two object points having different distances at the same time without a movable portion.

WO2013/146506A discloses an imaging device that is capable of improving image quality of an image captured using a lens having the above-described various optical characteristics. In the imaging device, various lenses and directional sensors are combined therein, and pupil splitting is used, so that plural captured images in which at least one of a focal distance or a focusing distance is different are acquired. According to this imaging device, the influence of luminous flux passed through a region other than "one region" among plural regions of an imaging lens is eliminated from an image generated associated with "the one region".

SUMMARY OF THE INVENTION

As described above, in a case where imaging is simultaneously performed for plural types of images using plural types of optical systems having different optical characteristics, imaging light may be mixed between images to cause deterioration in image quality. In particular, in the case of imaging using pupil splitting, if a pupil selection characteristic (light split characteristic) is not good, a multiple image in which components of plural types of images are mixed may be generated.

A technique that reduces the influence of an unnecessary component in such an image is disclosed in WO2013/146506A, it is extremely difficult to completely remove the influence of imaging light mixed between images. In particular, in a case where linearity of an imaging sensor to be used is low, in a case where the intensity of imaging light received in an imaging sensor is excessively strong or excessively weak, in a case where image light (imaging signal) is leaked into an adjacent pixel of an imaging sensor, or in a case where a subject image has a sharp edge (contour) component, if a processing strength of image processing as disclosed in WO2013/146506A becomes high, mixed imaging light is contrarily highlighted, which may make it difficult to sufficiently improve image quality.

Further, when performing image processing for reducing and removing the influence of interference (crosstalk) of imaging light between optical systems, it is necessary to consider an influence on a system due to a calculation time (processing time), cost, and installation of an image processing circuit or an image processing program necessary for such image processing. For example, if long time is necessary for a computation process, if the cost for realizing image processing is high, or if installation of an image processing circuit or an image processing program is complicated, this serves as a factor for obstructing realization of such image processing, which is not preferable.

Accordingly, it is desirable to provide a new technique for reducing the influence of interference of imaging light between optical systems from a point of view different from that of the related art. In particular, since the type of images and the degree of image quality demanded in actual imaging vary according to situations, it is desirable to provide a new image quality improvement technique having a simplified configuration adaptive for actual imaging situations.

In consideration of the above-described problems, an object of the invention is to provide an imaging technique and an application technique thereof capable of reducing the influence of interference of imaging light between optical systems according to actual imaging situations according to a simple processing configuration.

According to an aspect of the invention, there is provided an imaging device comprising: an imaging optical system that includes a first optical system and a second optical system having independent characteristics; an imaging element that includes a plurality of light-receiving sensors which are provided corresponding to each of the first optical system and the second optical system and pupil-split light passed through a corresponding optical system among the first optical system and the second optical system to selectively receive the light; an image generation unit that generates a first captured image from an imaging signal output from the light-receiving sensors corresponding to the first optical system and generates a second captured image from an imaging signal output from the light-receiving sensors corresponding to the second optical system; a focus adjustment unit that adjusts a focus state of each of the first optical system and the second optical system in an independent manner; and a focus controller that acquires importance degree information indicating the degrees of importance of the first captured image and the second captured image and controls the focus adjustment unit based on the importance degree information.

According to this aspect of the invention, it is possible to adjust a focus state of each of the first optical system and the second optical system in an independent manner based on the importance degree information. Thus, since the importance degree information is determined according to actual imaging situations, it is possible to adjust the focus state of each of the first optical system and the second optical system according to the actual imaging situations. On the other hand, in the imaging device of this aspect of the invention that employs the pupil splitting method, by adjusting the focus state of each of the first optical system and the second optical system, it is possible to control the influence of interference of imaging light between optical systems. Accordingly, in this aspect of the invention, by using importance degree information determined according to actual imaging situations, it is possible to reduce the influence of interference of imaging light between optical systems according to the actual imaging situations. Further, in this aspect of the invention, since addition of special hardware is not necessary and also a complicated computation process is not necessary, it is possible to reduce the influence of interference of imaging light between optical systems with a simplified configuration according to actual imaging situations.

Specific content of the importance degree information is not particularly limited, and thus, information directly or indirectly indicating "which one of the first captured image and the second captured image is important" may be used.

Here, "the first optical system and the second optical system having independent characteristics" may be realized by the first optical system and the second optical system having different optical characteristics. In other words, the expression of "independent" is a concept including a meaning of "(mutually) different", and the expression of "characteristics" is a concept including a meaning of "optical characteristics".

Preferably, the focus controller controls the focus adjustment unit so that the second optical system enters a defocus state in a case where the importance degree information indicates that the degree of importance of the first captured image is higher than that of the second captured image, and controls the focus adjustment unit so that the first optical system enters a defocus state in a case where the importance degree information indicates that the degree of importance of the second captured image is higher than that of the first captured image.

According to this aspect of the invention, in a case where the importance degree information indicates that the degree of importance of the first captured image is higher than that of the second captured image, the second optical system enters a defocus state, and in a case where the importance degree information indicates that the degree of importance of the second captured image is higher than that of the first captured image, the first optical system enters a defocus state. In this way, by controlling focus states of the first optical system and the second optical system, it is possible to reduce a high-frequency component of a captured image having a low degree of importance among the first captured image and the second captured image. In this way, since a high-frequency component having high visibility is reduced in a captured image having a low degree of importance, even when interference of imaging light occurs between the first optical system and the second optical system, it is possible to effectively reduce a visual influence of a captured image having a low degree of importance on a captured image having a high degree of importance.

Preferably, the defocus state of the first optical system is realized when a full width at half maximum of a point spread function of the first optical system becomes equal to or greater than a pixel pitch of the plurality of light-receiving sensors by controlling the focus adjustment unit by the focus controller, and the defocus state of the second optical system is realized when a full width at half maximum of a point spread function of the second optical system becomes equal to or greater than the pixel pitch of the plurality of light-receiving sensors by controlling the focus adjustment unit by the focus controller.

According to this aspect of the invention, a defocus state of the first optical system and a defocus state of the second optical system can be realized by adjusting the full widths at half maximum of the point spread functions of the first optical system and the second optical system to become equal to or greater than the pixel pitch of light-receiving sensors. Thus, it is possible to effectively reduce a high-frequency component of a captured image having a low degree of importance among the first captured image and the second captured image.

Preferably, the imaging device further comprises an instruction information acquisition unit that acquires instruction information from a user, and the focus controller acquires the importance degree information based on the instruction information from the user acquired by the instruction information acquisition unit.

According to this aspect of the invention, it is possible to determine the importance degree information based on instruction information from a user. Accordingly, for example, a user can determine actual imaging situations, and can determine whether any one of the first captured image and the second captured image is important, to thereby determine the importance degree information.

Preferably, the imaging device further comprises a scene analysis unit that analyzes an imaging scene, and the focus controller that acquires the importance degree information based on an analysis result in the scene analysis unit.

According to this aspect of the invention, it is possible to determine the importance degree information according to an actual imaging scene.

Preferably, the scene analysis unit detects a tracking target in the imaging scene based on at least one of the first captured image or the second captured image and analyzes a temporal behavior of the tracking target, and the focus controller acquires the importance degree information based on the temporal behavior of the tracking target analyzed by the scene analysis unit.

According to this aspect of the invention, it is possible to determine the importance degree information based on a temporal behavior of a tracking target. A method for determining the tracking target is not particularly limited, and the tracking target may be determined using an arbitrary method.

Preferably, the imaging device further comprises an image correction unit that performs correction of the first captured image and the second captured image to reduce the influence of light passed through the second optical system in the first captured image and to reduce the influence of light passed through the first optical system in the second captured image.

According to this aspect of the invention, it is possible to reduce the influence of light passed through an optical system that is not originally intended, in the first captured image and the second captured image, to thereby enhance image quality.

Preferably, the image correction unit performs the correction based on an inverse matrix of a matrix formed by detection gain distributions and radio interference gain distributions of the first captured image and the second captured image.

According to this aspect of the invention, it is possible to enhance image quality of the first captured image and the second captured image using correction based on an inverse matrix of a matrix formed by detection gain distributions and radio interference gain distributions.

The detection gain distributions and the radio interference gain distributions represent distribution information relating to imaging light passed through the first optical system and imaging light passed through the second optical system, respectively. Each detection gain distribution represents a distribution (information data) of imaging light appropriately received by light-receiving sensors that are originally intended. For example, the detection gain distribution is represented by "a distribution (information data) of imaging light received by the light-receiving sensors corresponding to the first optical system in imaging light passed through the first optical system" and "a distribution (information data) of imaging light received by the light-receiving sensors corresponding to the second optical system in imaging light passed through the second optical system". On the other hand, each radio interference gain distribution represents a distribution (information data) of imaging light inappropriately received by light-receiving sensors that are not originally intended. For example, the radio interference gain distribution is represented by "a distribution (information data) of imaging light received by the light-receiving sensors corresponding to the second optical system in imaging light passed through the first optical system" and "a distribution (information data) of imaging light received by the light-receiving sensors corresponding to the first optical system in imaging light passed through the second optical system".

Preferably, the first optical system and the second optical system are different from each other in at least one of focal distances or focusing distances thereof.

According to this aspect of the invention, it is possible to reduce the influence of interference of imaging light that occurs between the first optical system and the second optical system which are different from each other in at least one of focal distances or focusing distances thereof, according to actual imaging situations.

Preferably, the second optical system is provided in a peripheral region of the first optical system, and has the same optical axis as that of the first optical system.

According to this aspect of the invention, it is possible to reduce the influence of interference of imaging light that occurs between the first optical system and the second optical system which are disposed to form concentric circles, for example, according to actual imaging situations.

Preferably, among a plurality of regions of the imaging optical system which are integrally provided, a first region is configured by the first optical system, and a second region is configured by the second optical system.

According to this aspect of the invention, it is possible to reduce the influence of interference of imaging light that occurs between the first optical system and the second optical system which are integrally provided, according to actual imaging situations.

According to another aspect of the invention, there is provided an imaging method in an imaging device comprising an imaging optical system that includes a first optical system and a second optical system having independent characteristics, an imaging element that includes a plurality of light-receiving sensors which are provided corresponding to each of the first optical system and the second optical system and pupil-split light passed through a corresponding optical system among the first optical system and the second optical system to selectively receive the light, an image generation unit that generates a first captured image from an imaging signal output from the light-receiving sensors corresponding to the first optical system and generates a second captured image from an imaging signal output from the light-receiving sensors corresponding to the second optical system, and a focus adjustment unit that adjusts a focus state of each of the first optical system and the second optical system in an independent manner, the method comprising: a step of acquiring importance degree information indicating the degrees of importance of the first captured image and the second captured image; and a step of controlling the focus adjustment unit based on the importance degree information.

According to the invention, by determining importance degree information according to actual imaging situations, it is possible to reduce the influence of interference of imaging light between optical systems according to the actual imaging situations with a simplified configuration using pupil splitting.

BRIEF DESCRIPTION OF THE DRAWINGS

FIG. 8 is a schematic view illustrating a mechanism of interference (crosstalk) of imaging light between optical systems.

FIG. 9 is a diagram showing an example of captured images according to the first embodiment, and shows an output wide-angle image and an output telephotographic image which are captured and acquired at a "timing when only the wide-angle image is necessary and the telephotographic image is not necessary".

FIG. 10 is a diagram illustrating an example of captured images according to the first embodiment, which shows an output wide-angle image and an output telephotographic image which are captured and acquired at a "timing when the wide-angle image is not necessary and only the telephotographic image is necessary".

FIGS. 12A and 12B are diagrams illustrating a general point spread phenomenon of an imaging optical system (lens), in which FIG. 12A is a sectional view showing an overview of a system in which light from a point light source reaches an imaging element through the imaging optical system, and FIG. 12B is a diagram schematically showing a point spread function (PSF) of light received by the imaging element.

FIG. 13 is a diagram illustrating a full width at half maximum (FWHM) of the point spread function (PSF) shown in FIG. 12B.

FIG. 17 shows a simplified determinant of the determinant shown in FIG. 16.

FIG. 18 shows elements w1_11 to w1_$mn$ that form "W1 (pixel components (pixel values) of a true wide-angle image)" shown in FIG. 17.

FIG. 19 shows a calculation formula of "w1_$ij$" derived based on the determinant shown in FIG. 17.

FIG. 20 shows a calculation formula of "t1_$ij$" derived based on the determinant shown in FIG. 17.

FIGS. 21A and 21B show image examples in a case where a "correction process based on an inverse matrix of a matrix configured by detection gain distributions and radio interference gain distributions" according to a second embodiment is performed, without performing "the focus control of the imaging optical system" according to the first embodiment, in which FIG. 21A shows a wide-angle image example, and FIG. 21B shows a telephotographic image example.

FIGS. 22A and 22B show image examples in a case where "the correction process based on the inverse matrix of the matrix configured by the detection gain distributions and the radio interference gain distributions" according to the second embodiment is performed after "the focus control of the imaging optical system" according to the first embodiment is performed, in which FIG. 22A shows a wide-angle image example, and FIG. 22B shows a telephotographic image example.

DESCRIPTION OF THE PREFERRED EMBODIMENTS

Hereinafter, embodiments of the invention will be described with reference to the accompanying drawings.

The invention may be widely applied to an imaging device and an imaging method for capturing plural types of images using imaging optical systems having plural types of optical characteristics, and an application technique thereof, and an applicable technical field thereof is not particularly limited. For example, the invention may be applied to an imaging device that performs imaging automatically, as well as an imaging device that performs imaging according to a user operation. Further, the invention may be applied to an imaging device that captures moving images, as well as an imaging device that captures still images.

Figure 1:
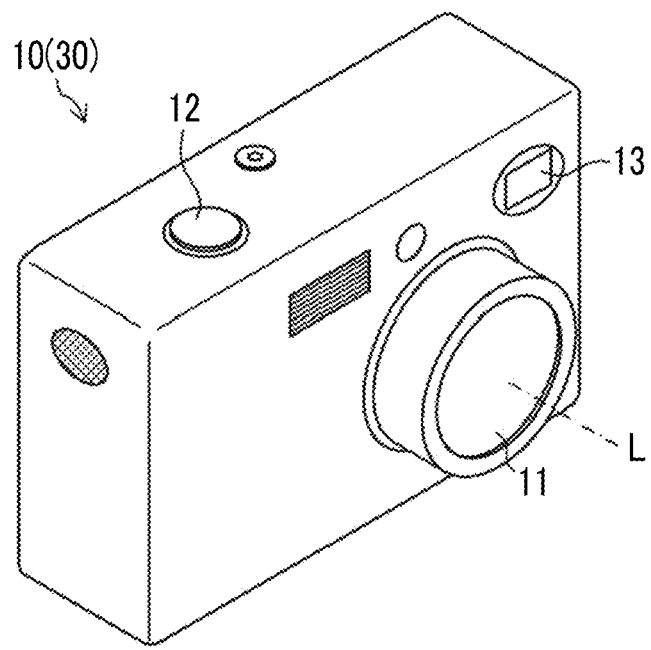
FIG. 1 is a perspective view showing an example of a digital camera (imaging device) to which the invention is applicable.

FIG. 1 is a perspective view showing an example of a digital camera 10 (imaging device 30) to which the invention is applicable. In the example shown in FIG. 1, an imaging optical system 11, a flash 13, and the like are provided on a front surface of a camera body of the digital camera 10, and a release button 12 and the like are provided on an upper surface of the camera body. In FIG. 1, sign "L" represents an optical axis of the imaging optical system 11.

Figure 2:
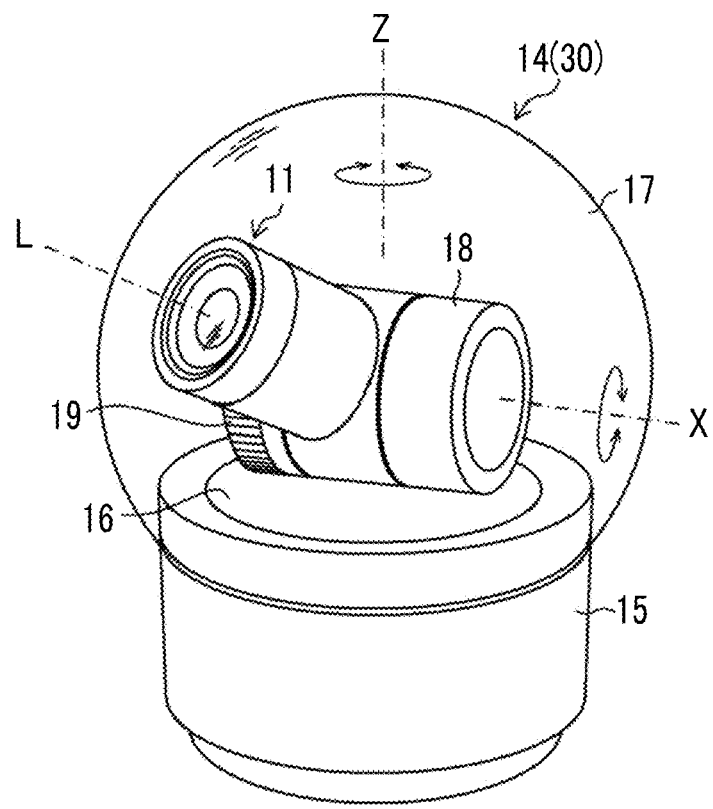
FIG. 2 is a perspective view showing an example of an automatic tracking imaging device (imaging device) to which the invention is applicable.

FIG. 2 is a perspective view showing an example of an automatic tracking imaging device 14 (imaging device 30) to which the invention is applicable. In the automatic tracking imaging device 14 shown in FIG. 2, a holding portion 18 including a gear 19 and the imaging optical system 11 attached to the holding portion 18 are fixedly mounted on a stand 16 provided on a device body 15. The stand 16 is provided to be rotatable around an axis of the device body 15 in a vertical direction Z, and is capable of performing a pan operation around the axis in the vertical direction Z by a pan driving unit (not shown). The gear 19 is provided on the same axis as an axis in a horizontal direction X, and a driving power is transmitted from a tilt driving unit (not shown) through the gear 19, so that the imaging optical system 11 is rotated upward and downward to perform a tilt operation. The imaging optical system 11, the holding portion 18 (the gear 19), and the stand 16 are covered by a dome cover 17 for dust-proof and drip-proof.

Respective embodiments and respective modification examples of the invention to be described hereinafter may be applied to the digital camera 10 as shown in FIG. 1, or may be applied to the automatic tracking imaging device 14 as shown in FIG. 2, for example.

First Embodiment

Figure 3:
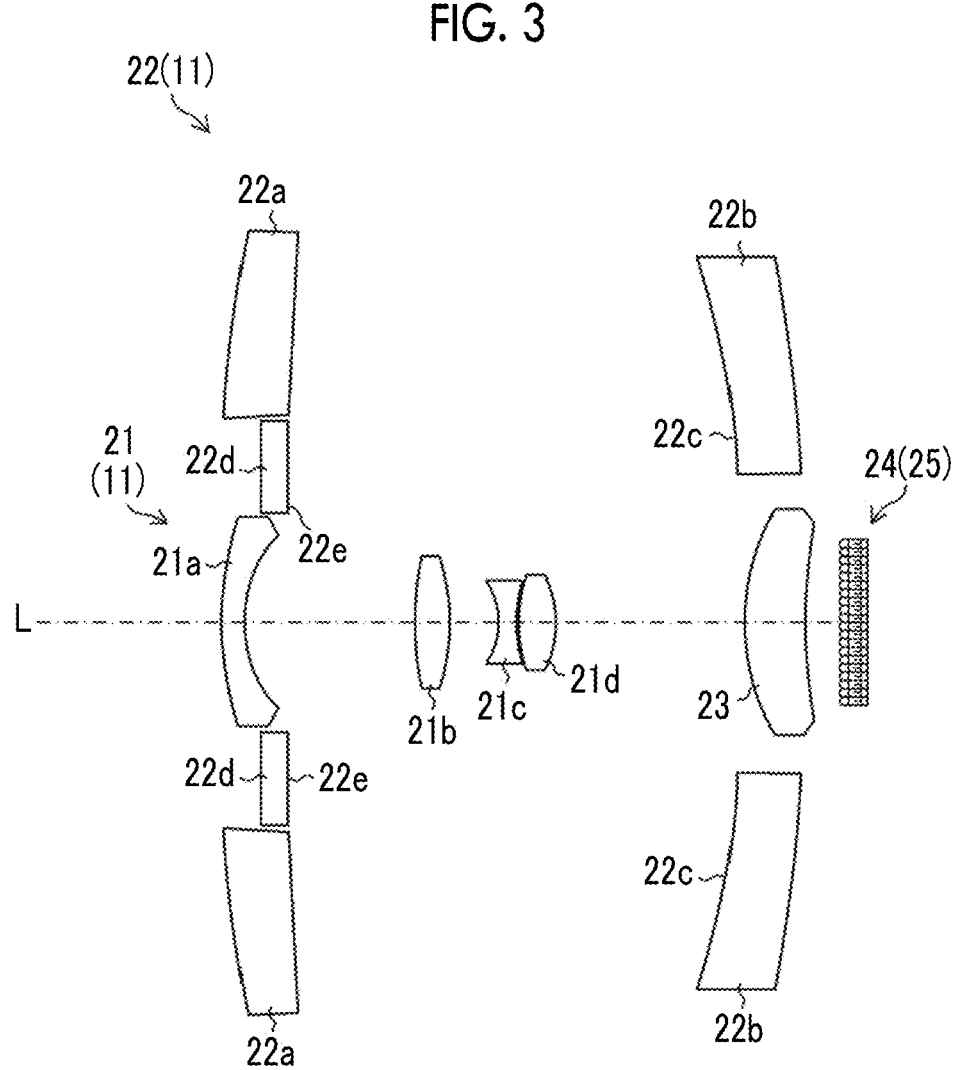
FIG. 3 is a diagram showing a sectional configuration of an imaging optical system according to a first embodiment.

FIG. 3 is a diagram showing a sectional configuration of the imaging optical system 11 and an imaging element 24 according to the first embodiment.

The imaging optical system 11 includes a first optical system 21 and a second optical system 22 which have independent characteristics. Particularly, in this embodiment, the first optical system 21 and the second optical system 22 are configured by optical systems having different focal distances. In other words, the imaging optical system 11 of this embodiment includes the first optical system 21 configured by a "wide-angle imaging lens group" and the second optical system 22 configured by a "telephotographic imaging lens group", and a wide-angle image and a telephotographic image are simultaneously captured by the imaging element 24.

The first optical system 21 shown in FIG. 3 includes a first wide-angle lens 21a, a second wide-angle lens 21b, a third wide-angle lens 21c, a fourth wide-angle lens 21d, and a common lens 23, disposed on the same optical axis L. On the other hand, the second optical system 22 includes a first telephotographic lens 22a, a first telephotographic reflector 22b in which a first telephotographic reflecting mirror 22c is provided, a second telephotographic reflector 22d in which a second telephotographic reflecting mirror 22e is provided, and the common lens 23. The first optical system 21 (particularly, the first wide-angle lens 21a, the second wide-angle lens 21b, the third wide-angle lens 21c, and the fourth wide-angle lens 21d) forms a central optical system. On the other hand, the second optical system 22 (particularly, the first telephotographic lens 22a, the first telephotographic reflector 22b, the first telephotographic reflecting mirror 22c, the second telephotographic reflector 22d, and the second telephotographic reflecting mirror 22e) is provided in a peripheral region of the central optical system formed by the first optical system 21, and forms a concentric circle together with the central optical system formed by the first optical system 21. The common lens 23 is disposed on the optical axis L, and is shared between the first optical system 21 and the second optical system 22.

In this way, the second optical system 22 includes a lens group (the first telephotographic lens 22a and the common lens 23) provided in the vicinity of a lens group (the first wide-angle lens 21a to the fourth wide-angle lens 21d, and the common lens 23) that forms the first optical system 21, and a reflecting mirror group (the first telephotographic reflecting mirror 22c (the first telephotographic reflector 22b) and the second telephotographic reflecting mirror 22e (the second telephotographic reflector 22d)), and has the same optical axis L as that of the first optical system 21, but has a focal distance different from that of the first optical system 21.

The imaging element 24 is configured such that plural light-receiving sensors 25 are disposed in two dimensions in a direction which is perpendicular to the optical axis L. Particularly, the imaging element 24 of this embodiment forms a directional sensor that is capable of receiving a wide-angle image light emitted through the first optical system 21 and a telephotographic image light emitted through the second optical system 22 at the same time and outputting an imaging signal for generating a wide-angle image (a first captured image) and an imaging signal for generating a telephotographic image (a second captured image). In other words, the imaging element 24 of this embodiment includes the plural light-receiving sensors 25 that are provided corresponding to each of the respective first optical system 21 and second optical system 22 and pupil-split light passed through a corresponding optical system among the first optical system 21 and the second optical system 22 to selectively receive the light.

Figure 4:
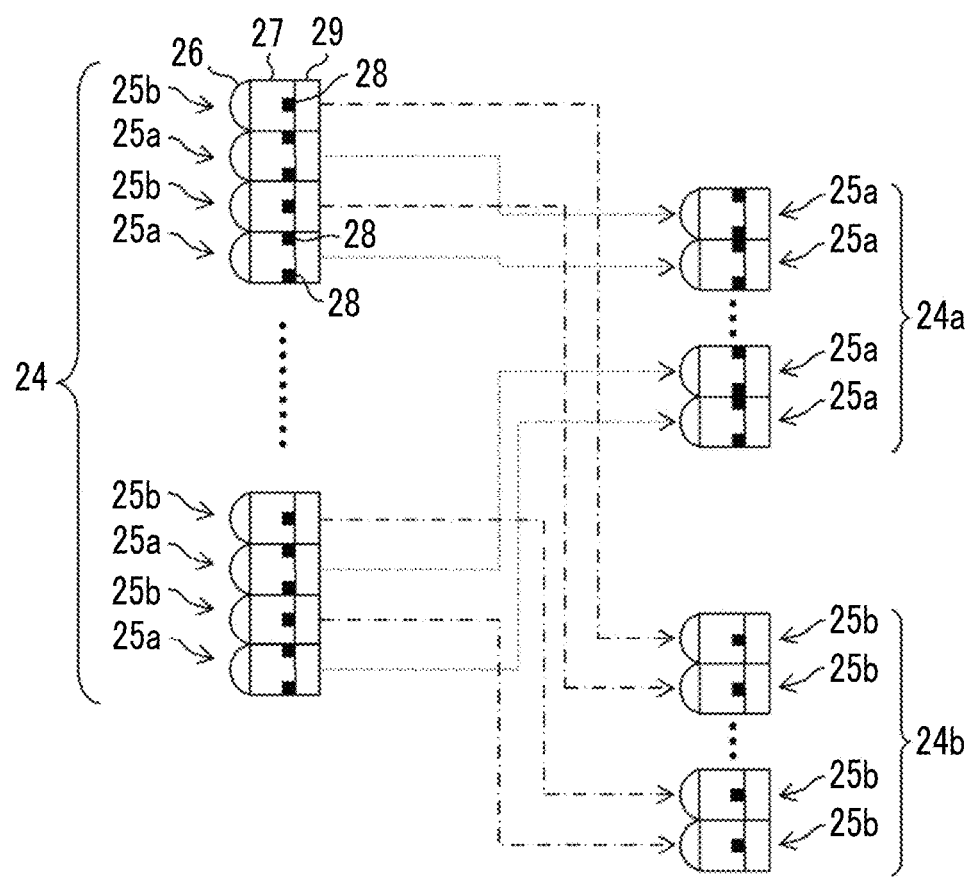
FIG. 4 is a diagram illustrating an example of a detailed sectional configuration of an imaging element shown in FIG. 3.

FIG. 4 is a diagram showing an example of a detailed sectional configuration of the imaging element 24 shown in FIG. 3.

The plural light-receiving sensors 25 that form the imaging element 24 of this example includes "first light-receiving sensors 25a for a wide-angle image" corresponding to the first optical system 21 and "second light-receiving sensors 25b for a telephotographic image" corresponding to the second optical system 22, in which the first light-receiving sensors 25a and the second light-receiving sensors 25b are alternately disposed in two dimensions. The first plural light-receiving sensors 25a included in the imaging element 24 form a "first imaging element 24a for receiving a wide-angle image light passed through the first optical system 21", and outputs an imaging signal for generating a wide-angle image. Further, the second plural light-receiving sensors 25b included in the imaging element 24 form a "second imaging element 24b for receiving a telephotographic image light passed through the second optical system 22", and outputs an imaging signal for generating a telephotographic image.

Each of the first light-receiving sensors 25a and the second light-receiving sensors 25b includes a micro-lens 26, a photodiode 29, and an interlayer 27 disposed between the micro-lens 26 and the photodiode 29. A light shielding mask 28 is provided in the interlayer 27. In the first light-receiving sensor 25a, the light shielding mask 28 is disposed in a peripheral portion of a light-receiving face of the photodiode 29, and in the second light-receiving sensor 25b, the light shielding mask 28 is disposed at the center of the photodiode 29. The disposition of the light shielding masks 28 is determined according to which one of the first optical system 21 and the second optical system 22 the light shielding masks 28 is associated with, and each light shielding mask 28 blocks light from an optical system which is not associated therewith, and does not block light from an optical system which is associated therewith and allows the photodiode 29 to receive the latter light.

In this example, plural light-receiving sensors that pupil-split light passed through an associated optical system among the first optical system 21 and the second optical system 22 to selectively receive the light are realized by the light-receiving sensors 25 including the light shielding mask 28, but the pupil splitting may be realized by other means. For example, the light shielding mask 28 may be provided at a front stage (for example, between the micro-lens 26 and the common lens 23 (see FIG. 3)) of the micro-lens 26, or light shielding means (for example, a liquid crystal shutter, or the like) other than the light shielding mask 28 may be used.

A member other than the light shielding mask 28 may be provided in the interlayer 27. For example, color filters such as RGB (red, green, and blue) color filters, interconnects and circuits, or the like may be provided in the interlayer 27.

Figure 5:
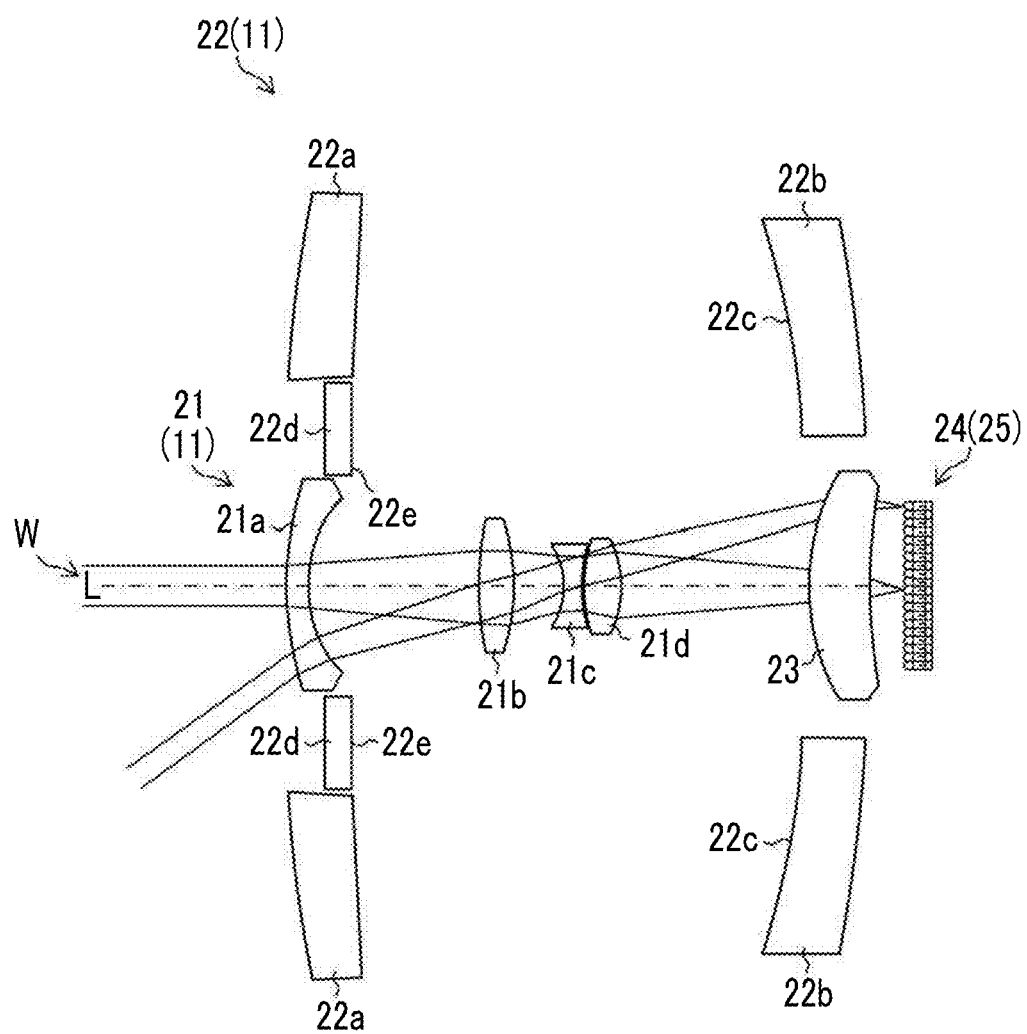
FIG. 5 is a diagram showing an optical path of a wide-angle image light which is incident to an imaging optical system (particularly, a first optical system) shown in FIG. 3 and an imaging element (particularly, a first imaging element (see FIG. 4)).

FIG. 5 is a diagram showing an optical path of a wide-angle image light W incident to the imaging optical system 11 (particularly, the first optical system 21) and the imaging element 24 (particularly, the first imaging element 24a (see FIG. 4)) shown in FIG. 3. In this embodiment, the wide-angle image light W sequentially passes through the first wide-angle lens 21a, the second wide-angle lens 21b, the third wide-angle lens 21c, the fourth wide-angle lens 21d, and the common lens 23 of the first optical system 21, to thereby form a wide-angle image on the imaging element 24.

Figure 6:
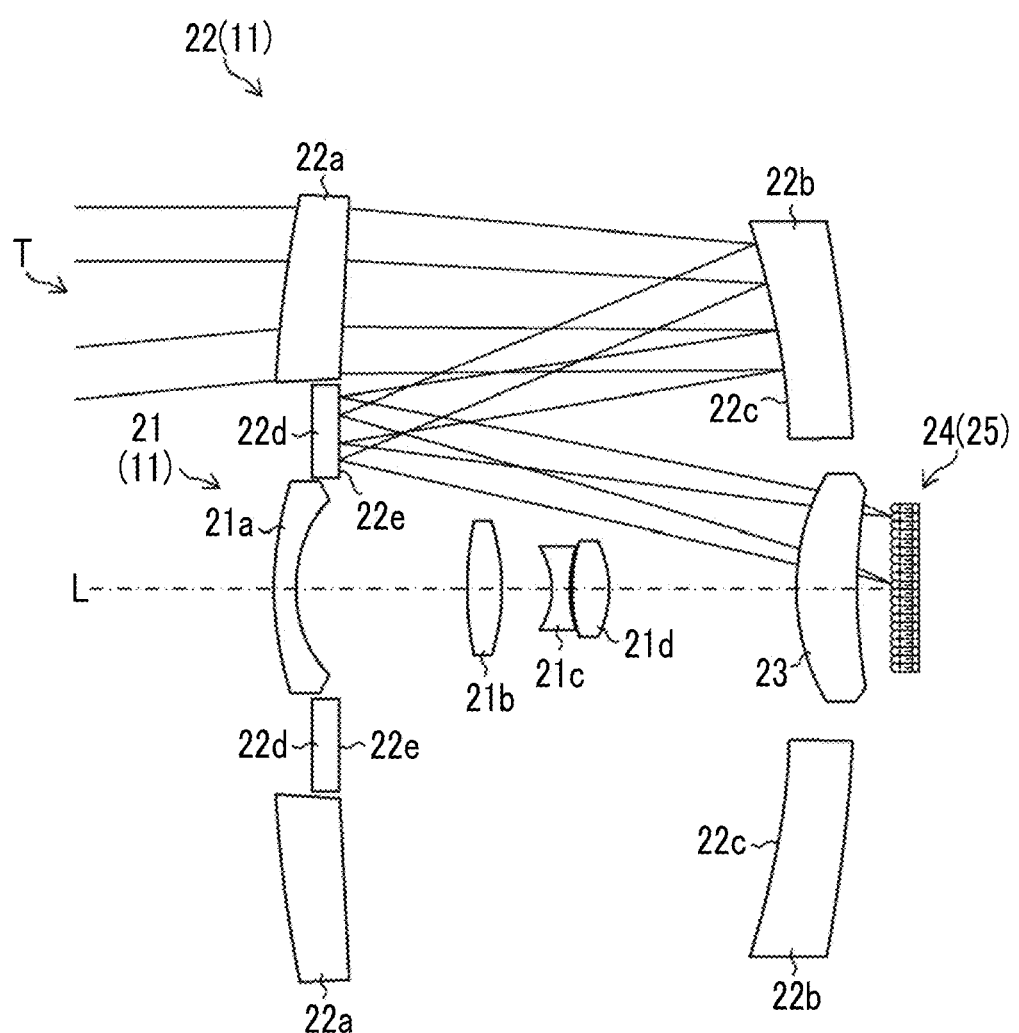
FIG. 6 is a diagram showing an optical path of a telephotographic image light which is incident to an imaging optical system (particularly, a second optical system) shown in FIG. 3 and an imaging element (particularly, a second imaging element (see FIG. 4)).

FIG. 6 is a diagram showing an optical path of a telephotographic image light T incident to the imaging optical system 11 (particularly, the second optical system 22) and the imaging element 24 (particularly, the second imaging element 24b (see FIG. 4) shown in FIG. 3. In this embodiment, the telephotographic image light T passes through (transmits) the first telephotographic lens 22a, is reflected by each of the first telephotographic reflecting mirror 22c and the second telephotographic reflecting mirror 22e, and then, passes through the common lens 23, to thereby form a telephotographic image on the imaging element 24. In this way, since the optical path is turned back due to reflection of the telephotographic image light T from the first telephotographic reflecting mirror 22c and the second telephotographic reflecting mirror 22e, it is possible to shorten the length of the second optical system 22 for telephotographic imaging having a long focal distance in the direction of the optical axis L.

Next, deterioration in image quality that occurs in a wide-angle image (first captured image) and a telephotographic image (second captured image) acquired by the imaging optical system 11 and the imaging element 24 described above will be described.

Figure 7B:
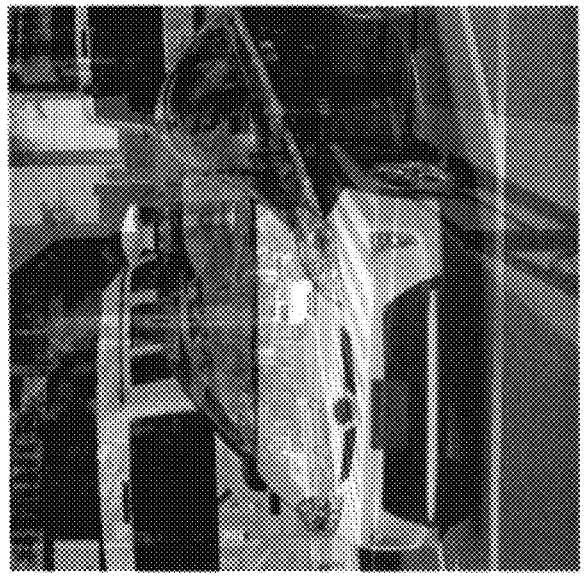
FIGS. 7A and 7B show examples of a wide-angle image (see FIG. 7A) and a telephotographic image (see FIG. 7B) which are affected by deterioration in image quality due to interference (crosstalk) of imaging light between the first optical system and the second optical system.
Figure 7A:

FIGS. 7A and 7B show examples of a wide-angle image (see FIG. 7A) and a telephotographic image (see FIG. 7B) which are affected by deterioration in image quality due to interference (crosstalk) of imaging light between the first optical system 21 and the second optical system 22.

In the imaging optical system 11 and the imaging element 24, in a case where pupil splitting performance between a wide-angle image light that reaches the imaging element 24 through the first optical system 21 and a telephotographic image light that reaches the imaging element 24 through the second optical system 22 is not sufficient, separation of the wide-angle image light and the telephotographic image light does not become sufficient. Thus, an image in which a wide-angle image and a telephotographic image are mixed in an overlapping manner is obtained. In other words, if a telephotographic image light is leaked into the first imaging element 24a (the photodiode 29 (see FIG. 4) of the first light-receiving sensors 25a) that is intended to receive only a wide-angle image light, as shown in FIG. 7A, a wide-angle image in which a part of a telephotographic image component is overlapped is obtained. Similarly, if a wide-angle image light is leaked into the second imaging element 24b (the photodiode 29 (see FIG. 4) of the second light-receiving sensors 25b) that is intended to receive only a telephotographic image light, as shown in FIG. 7B, a telephotographic image in which a part of a wide-angle image component is overlapped is obtained.

In this way, if interference occurs between imaging light (wide-angle image light) passed though the first optical system 21 and imaging light (telephotographic image light) passed through the second optical system 22, a signal of an image component which is originally intended not to be separately received is mixed into an output of each of the light-receiving sensors 25 that form the imaging element 24.

FIG. 8 is a conceptual diagram illustrating a mechanism of interference of imaging light between optical systems.

In FIG. 8, sign "Iw1" represents a true wide-angle image, and sign "It1" represents a true telephotographic image. Here, "the true wide-angle image Iw1" and "the true telephotographic image It1" are images which are captured and acquired in a state where interference does not occur between imaging light passed through the first optical system 21 and the imaging light passed through the second optical system 22. On the other hand, sign "Iw2" represents an output wide-angle image generated from an imaging signal which is actually output from the first imaging element 24a (the first light-receiving sensors 25a), and sign "It2" represents an output telephotographic image generated from an imaging signal which is actually output from the second imaging element 24b (the second light-receiving sensors 25b).

In a case where a wide-angle image and a telephotographic image are captured using the imaging device 30 (see FIGS. 1 and 2) that includes the imaging optical system 11 and the imaging element 24 shown in FIG. 3, if the imaging device 30 (particularly, the light shielding mask 28 of the imaging element 24) has sufficient pupil splitting performance, imaging signals indicating the true wide-angle image Iw1 and the true telephotographic image It1 shown in FIG. 8 are output from the imaging element 24. However, as described above, in a case where the pupil splitting performance is not sufficient and interference occurs between a wide-angle image light and a telephotographic image light, an imaging signal indicating a multiple image in which a wide-angle image and a telephotographic image are mixed is output from each of the first imaging element 24a and the second imaging element 24b, as in an output wide-angle image Iw2 and an output telephotographic image It2 shown in FIG. 8.

For example, as shown in FIG. 8, in imaging light of the true wide-angle image Iw1, distribution information (index) indicating a component which is appropriately received by the first imaging element 24a (the first light-receiving sensors 25a) is represented as a "wide-angle detection gain distribution D1", and distribution information (index) indicating a component which is inappropriately received by the second imaging element 24b (the second light-receiving sensors 25b) is represented as a "wide-angle interference gain distribution D2". Further, in imaging light of the true telephotographic image It1, distribution information indicating a component which is inappropriately received by the first imaging element 24a (the first light-receiving sensors 25a) is represented as a "telephotographic interference gain distribution D3", and distribution information indicating a component which is appropriately received by the second imaging element 24b (the second light-receiving sensors 25b) is represented as a "telephotographic detection gain distribution D4".

In this case, a wide-angle image component which is a wide-angle image component obtained by applying the wide-angle detection gain distribution D1 to the true wide-angle image Iw1 and is received by the first imaging element 24a (the first light-receiving sensors 25a) is represented as a "true wide-angle image component E1". A telephotographic image component which is a telephotographic image component obtained by applying the telephotographic interference gain distribution D3 to the true telephotographic image It1 and is received by the first imaging element 24a (the first light-receiving sensors 25a) is represented as a "interference telephotographic image component E2". Further, a wide-angle image component which is a wide-angle image component obtained by applying the wide-angle interference gain distribution D2 to the true wide-angle image Iw1 and is received by the second imaging element 24b (the second light-receiving sensors 25b) is represented as an "interference wide-angle image component E3". A telephotographic image component which is a telephotographic image component obtained by applying the telephotographic detection gain distribution D4 to the true telephotographic image It1 and is received by the second imaging element 24b (the second light-receiving sensors 25b) is represented as a "true telephotographic image component E4".

In this case, the output wide-angle image Iw2 generated by the imaging signal output from the first imaging element 24a (the first light-receiving sensors 25a) is based on an image obtained by adding up the true wide-angle image component E1 and the interference telephotographic image component E2. Further, the output telephotographic image It2 generated by the imaging signal output from the second imaging element 24b (the second light-receiving sensors 25b) is based on an image obtained by adding up the interference wide-angle image component E3 and the true telephotographic image component E4.

As the pupil splitting performance of the imaging device is better, the wide-angle image light and the telephotographic image light are separated from each other with higher accuracy to be received by the imaging element 24, a component ratio of the interference telephotographic image component E2 and the interference wide-angle image component E3 becomes close to zero (blank), the output wide-angle image Iw2 becomes close to the true wide-angle image Iw1, and the output telephotographic image It2 becomes close to the true telephotographic image It1. On the other hand, as the pupil splitting performance of the imaging device is worse, the wide-angle image light and the telephotographic image light are not less sufficiently separated from each other to be received by the imaging element 24, the component ratio of the interference telephotographic image component E2 and the interference wide-angle image component E3 becomes larger, a proportion of the interference telephotographic image component E2 in the output wide-angle image Iw2 becomes larger, and a proportion of the interference wide-angle image component E3 in the output telephotographic image It2 becomes larger.

In this way, in a case where interference of imaging light occurs between optical systems, an imaging signal output from the imaging element 24 corresponds to an image signal obtained by adding up an image component obtained by applying a detection gain distribution to a true image and an image component obtained by applying an interference gain distribution to an image of the other channel. Since an image (imaging signal) in which a wide-angle image and a telephotographic image are overlapped is output due to interference (crosstalk) in such a directional sensor (imaging element 24), a captured image having low image quality is output from an imaging device having insufficient pupil splitting performance.

As a result of extensive reviews in consideration of the above-described problems, the present inventors found that it was possible to effectively reduce the influence of interference of imaging light between optical systems according to actual imaging situations by independently adjusting a focus state of each of the first optical system 21 and the second optical system 22 according to the degrees of importance of a wide-angle image (first captured image) and a telephotographic image (second captured image).

In other words, in the imaging device 30 capable of simultaneously capturing a wide-angle image and a telephotographic image as in the present embodiment, in a case where both images of the wide-angle image and the telephotographic image are necessary, a focus control of the imaging optical system 11 (the first optical system 21 and the second optical system 22) is performed so that both images come into focus. On the other hand, even in imaging using a camera capable of simultaneously capturing a wide-angle image and a telephotographic image, there is a "timing when only the wide-angle image is necessary and the telephotographic image is not necessary" or a "timing when the wide-angle image is not necessary and only the telephotographic image is necessary".

The present inventors newly found that it was possible to effectively reduce deterioration in image quality of a desired image by controlling a focus state of the imaging optical system 11 (the first optical system 21 and the second optical system 22) according to actual imaging conditions thereof.

In other words, at "the timing when only the wide-angle image is necessary and the telephotographic image is not necessary", a focus state of the first optical system 21 for capturing the wide-angle image is adjusted to a state where focusing on a desired subject is performed, but a focus state of the second optical system 22 for capturing the telephotographic image is adjusted to an out-of-focus state (defocus state) on purpose. On the other hand, at "the timing when the wide-angle image is not necessary and only the telephotographic image is necessary", a focus state of the second optical system 22 for capturing the telephotographic image is adjusted to a state where focusing on a desired subject is performed, but a focus state of the first optical system 21 for capturing the wide-angle image is adjusted to an out-of-focus state (defocus state) on purpose. In this way, by adaptively controlling the focus state of the imaging optical system 11 (the first optical system 21 and the second optical system 22) according to imaging situations, the following technical benefits are obtained in terms of a spatial frequency of a light component receive by the imaging element 24 (the light-receiving sensors 25).

Namely, since imaging is performed in a focused state with respect to a necessary image among the wide-angle image (first captured image) and the telephotographic image (second captured image), a high spatial frequency component in addition to a low spatial frequency component is transmitted to the imaging element 24 (the light-receiving sensors 25). Thus, with respect to a necessary image among the wide-angle image and the telephotographic image, accurate image data (imaging signal) in which even an edge component or the like can be visually recognized is output from the imaging element 24 (the light-receiving sensors 25).

On the other hand, since imaging is performed in an out-of-focus state with respect to an unnecessary image among the wide-angle image and the telephotographic image, only a low spatial frequency component is transmitted to the imaging element 24 (the light-receiving sensors 25), and a high spatial frequency component is not transmitted to the imaging element 24 (the light-receiving sensors 25). Thus, the unnecessary image among the wide-angle image and the telephotographic image is formed on the imaging element 24 (the light-receiving sensors 25) in a state where an edge component or the like which is easily visually recognized is blurred, and data about an out-of-state image (imaging signal) is output from the imaging element 24 (the light-receiving sensors 25).

Thus, even in a case where interference of imaging light occurs between the optical systems as shown in FIG. 8 and imaging light which is not originally intended is received by each of the light-receiving sensors 25, it is possible to reduce the influence of imaging light of an unnecessary image on a necessary image. In other words, by controlling a focus state of the imaging optical system 11, a high spatial frequency component with respect to imaging light of an unnecessary image does not reach the imaging element 24 (light-receiving sensors 25). Thus, even if imaging light of a necessary image interferers with imaging light of an unnecessary image, "an unnecessary image component which does not include a high spatial frequency component and is not easily visually recognized due to low visibility is mixed into "imaging light of a necessary image". Accordingly, the influence on the visibility of "the necessary image" due to the interference of such imaging light becomes relatively small.

FIG. 9 is a diagram showing an example of captured images according to the first embodiment, and shows an output wide-angle image Iw2 and an output telephotographic image It2 which are captured and acquired at "the timing when only the wide-angle image is necessary and the telephotographic image is not necessary". In this example, a focus state of the first optical system 21 for capturing the wide-angle image is adjusted to a state where focusing on a desired subject (in this example, a vehicle at the center) is performed, but a focus state of the second optical system 22 for capturing the telephotographic image is adjusted to an out-of-focus state (defocus state) on purpose to perform imaging. Accordingly, the true wide-angle image Iw1 transmitted by the first optical system 21 becomes an originally sharp image, but the true telephotographic image It1 transmitted by the second optical system 22 becomes an originally defocused image. Thus, in this embodiment, the output wide-angle image Iw2 (necessary image) generated by an imaging signal output from the imaging element 24 (particularly, the first imaging element 24a) becomes a sharp image compared with the previous output wide-angle image Iw2 shown in FIG. 8. The output telephotographic image It2 shown in FIG. 9 becomes a blurred image, but in this case, since the output telephotographic image It2 is an "unnecessary image", the sharpness of the output telephotographic image It2 does not cause a problem in reality.

FIG. 10 is a diagram illustrating an example of captured images according to the first embodiment, which shows an output wide-angle image Iw2 and an output telephotographic image It2 which are captured and acquired at "the timing when the wide-angle image is not necessary and only the telephotographic image is necessary". In this example, a focus state of the second optical system 22 for capturing the telephotographic image is adjusted to a state where focusing on a desired subject (in this example, a vehicle at the center) is performed, but a focus state of the first optical system 21 for capturing the wide-angle image is adjusted to an out-of-focus state (defocus state) on purpose to perform imaging. Accordingly, the true wide-angle image Iw1 transmitted by the second optical system 22 becomes an originally sharp image, but the true telephotographic image It1 transmitted by the first optical system 21 becomes an originally defocused image. Thus, in this embodiment, the output wide-angle image Iw2 (necessary image) generated by an imaging signal output from the imaging element 24 (particularly, the second imaging element 24b) becomes a sharp image compared with the previous output telephotographic image It2 shown in FIG. 8. The output wide-angle image Iw2 shown in FIG. 10 becomes a blurred image, but in this case, since the output wide-angle image Iw2 is an "unnecessary image", the sharpness of the output wide-angle image Iw2 does not cause a problem in reality.

Next, an example of a specific functional configuration of the imaging device 30 according to the above-described embodiment will be described.

Figure 11:
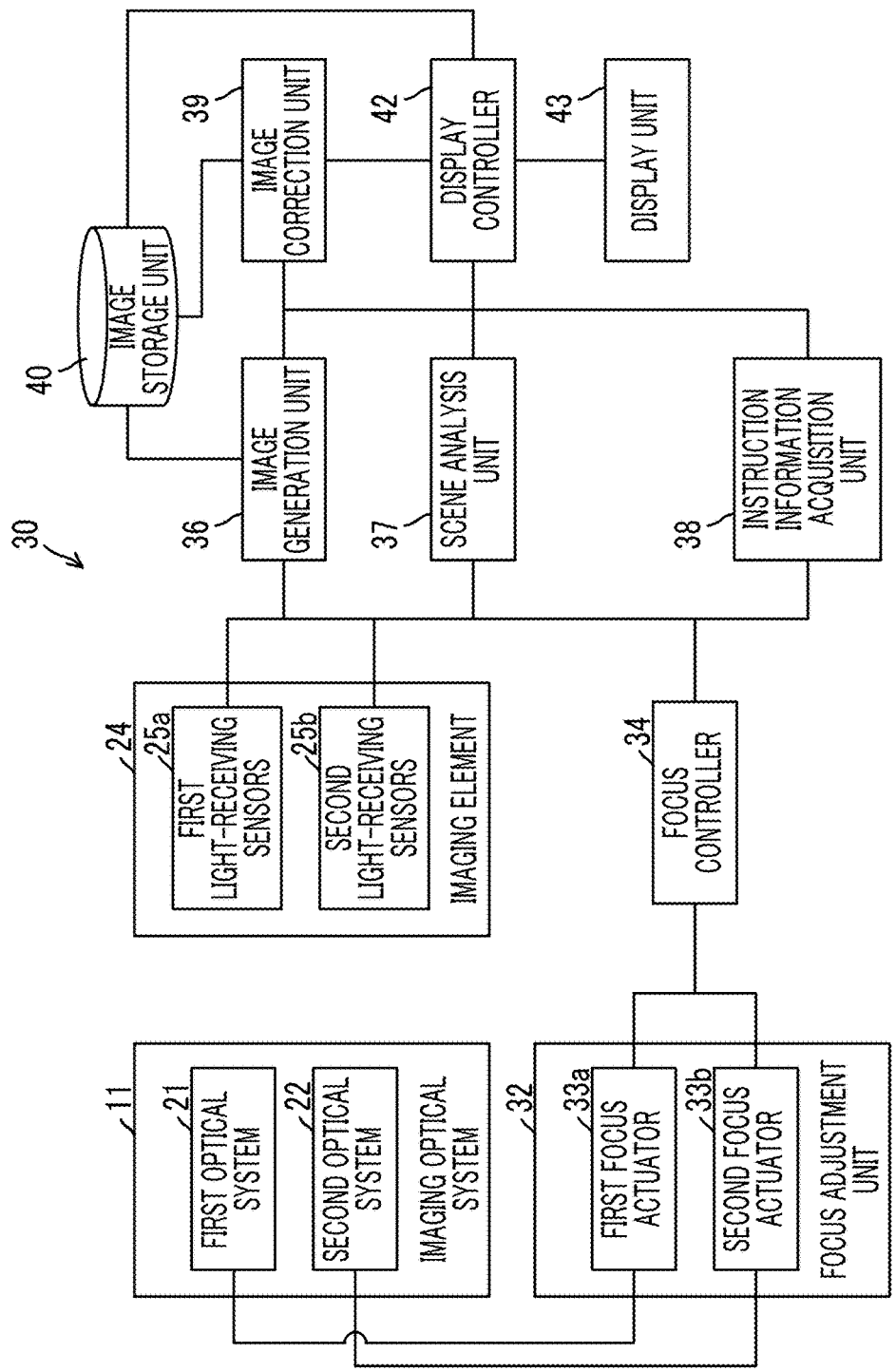
FIG. 11 is a block diagram showing a functional configuration of the imaging device according to the first embodiment.

FIG. 11 is a block diagram showing a functional configuration of the imaging device 30 according to the first embodiment.

The imaging device 30 in this example includes a focus adjustment unit 32, a focus controller 34, an image generation unit 36, a scene analysis unit 37, an instruction information acquisition unit 38, an image correction unit 39, an image storage unit 40, a display controller 42, and a display unit 43, in addition to the imaging optical system 11 and the imaging element 24 described above.

The image generation unit 36 generates a wide-angle image (first captured image) from an imaging signal output from the first light-receiving sensors 25a corresponding to the first optical system 21, and generates a telephotographic image (second captured image) output from the second light-receiving sensors 25b corresponding to the second optical system 22.

The image correction unit 39 corrects the wide-angle image (first captured image) and the telephotographic image (second captured image) generated by the image generation unit 36 to generate a desired image. An image correction process in the image correction unit 39 is not particularly limited, and for example, a process of eliminating noise components from the wide-angle image and the telephotographic image, a process of adding special effects to the wide-angle image and the telephotographic image, and the like, may be performed by the image correction unit 39. In the example shown in FIG. 11, the image correction unit 39 is provided at a rear stage with reference to the image generation unit 36, but the image correction unit 39 may be provided at a front stage with reference to the image generation unit 36.

Further, data about "the wide-angle image and the telephotographic image generated by the image generation unit 36" and/or data about "the wide-angle image and the telephotographic image after the image correction process in the image correction unit 39" may be stored in the image storage unit 40.

The display controller 42 controls the display unit 43, and causes the display unit 43 to display "the wide-angle image and the telephotographic image generated by the image generation unit 36" and/or "the wide-angle image and the telephotographic image after the image correction process in the image correction unit 39". The display controller 42 may acquire data about images (hereinafter, referred to as "display image data") to be displayed on the display unit 43 using an arbitrary method, may acquire the display image data from the image storage unit 40, or may directly acquire the display image data from the image generation unit 36 and the image correction unit 39. The display image data may include data image other than the optical image and the telephotographic image.

The instruction information acquisition unit 38 acquires instruction information from a user, and transmits the instruction information to each component (for example, the focus controller 34, the image generation unit 36, the display controller 42, or the like) of the imaging device 30. The instruction information from the user acquired by the instruction information acquisition unit 38 is not particularly limited, and information necessary for a process in each component of the imaging device 30 (for example, the focus controller 34, the image generation unit 36, the display controller 42, or the like) or "importance degree information indicating the degrees of importance of "a wide-angle image (first captured image) and a telephotographic image (second captured image)" may be acquired by the instruction information acquisition unit 38. The instruction information acquisition unit 38 may be configured by arbitrary components, and may include various devices (for example, buttons (such as the release button 12 in FIG. 1, for example), a touch panel, and the like)) that form a user interface.

The scene analysis unit 37 analyzes an imaging scene, and transmits the analysis result to each component (for example, the focus controller 34, the image correction unit 39, the display controller 42, or the like) of the imaging device 30. The scene analysis unit 37 may acquire image data which is an analysis target using an arbitrary method, may use imaging signals output from the imaging element 24 (the first light-receiving sensors 25a and the second light-receiving sensors 25b), may use image data generated by the image generation unit 36, may use image data after correction in the image correction unit 39, or may use image data stored in the image storage unit 40. An image scene analysis method is not particularly limited, and information necessary for a process in each component (for example, the focus controller 34, the image generation unit 36, the display controller 42, or the like) of the imaging device 30, or information that forms a base of "the importance degree information indicating the degrees of importance of the wide-angle image (first captured image) and the telephotographic image (second captured image)" which will be described later may be obtained by the analysis of the scene analysis unit 37.

The focus adjustment unit 32 includes a first focus actuator 33a and a second focus actuator 33b, and adjusts respective focus states of the first optical system 21 and the second optical system 22 in an independent manner. In other words, the first focus actuator 33a may adjust a focus state of the first optical system 21, and the second focus actuator 33b may adjust a focus state of the second optical system 22. The first focus actuator 33a and the second focus actuator 33b may be independently driven by the focus controller 34.

Driving methods of the first optical system 21 and the second optical system 22 using the first focus actuator 33a and the second focus actuator 33b are not particularly limited. For example, a part or all of a lens group and a mirror group that form each of the first optical system 21 and the second optical system 22 may be moved by each of the first focus actuator 33a and the second focus actuator 33b, to thereby adjust the focus states of the first optical system 21 and the second optical system 22. In this case, it is preferable to adjust the focus states of the first optical system 21 and the second optical system 22 by moving an optical component other than an optical component shared between the first optical system 21 and the second optical system 22. In other words, in this example, it is preferable that each of the first focus actuator 33a and the second focus actuator 33b moves an optical component other than the common lens 23 shared between the first optical system 21 and the second optical system 22 to adjust the focus states of the first optical system 21 and the second optical system 22.

The focus controller 34 controls the focus adjustment unit 32 (the first focus actuator 33a and the second focus actuator 33b) to control the focus states of the first optical system 21 and the second optical system 22. Particularly, the focus controller 34 of this embodiment acquires the importance degree information indicating the degrees of importance of the wide-angle image (first captured image) and the telephotographic image (second captured image), and controls the focus adjustment unit 32 based on the importance degree information.

The focus controller 34 may acquire the importance degree information using an arbitrary method. For example, in a case where a user of the imaging device 30 recognizes that "the wide-angle image has a degree of importance (priority) higher than that of the telephotographic image" or "the telephotographic image has a degree of importance higher than that of the wide-angle image", the user may directly or indirectly input instruction information in which such recognition is reflected to the instruction information acquisition unit 38. In such a case, the focus controller 34 may acquire the importance degree information based on the instruction information from the user acquired by the instruction information acquisition unit 38.

The focus controller 34 may acquire the importance degree information based on the analysis result in the scene analysis unit 37. For example, in a case where it is determined by the focus controller 34 that imaging in which "the wide-angle image has a degree of importance (priority) higher than that of the telephotographic image" is performed or imaging in which "the telephotographic image has a degree of importance higher than that of the wide-angle image" is performed from the analysis result of the imaging scene in the scene analysis unit 37, the focus controller 34 may acquire the importance degree information according to such determination.

The scene analysis unit 37 may detect a tracking target (main subject or the like) in an imaging scene based on at least one of a wide-angle image (first captured image) or a telephotographic image (second captured image), for example, and may analyze a temporal behavior of the tracking target. In this case, the focus controller 34 may acquire the importance degree information based on the temporal behavior of the tracking target analyzed by the scene analysis unit 37. For example, in a case where a movement of a subject (main subject) included in an imaging scene is analyzed by the scene analysis unit 37 and it is determined that the movement of the subject (main subject) which is an imaging target is relatively severe, it may be determined that "the degree of importance of the wide-angle image is higher than that of the telephotographic image" in terms of preferential tracking of the subject. On the other hand, in a case where it is determined that the movement of the main subject which is the imaging target is relatively smooth, it may be determined that "the degree of importance of the telephotographic image is higher than that of the wide-angle image" in terms of preferential detailed imaging of the subject.

Here, the term "main subject" or "tracking target" means a "main imaging target" that can be specified from an arbitrary viewpoint. Accordingly, for example, a subject which is positioned in a focus area, a subject which is present at the center of an image, a subject such as a person who is moving, or a subject specified from these plural viewpoints may be used as the main subject or the tracking target.

The focus controller 34 controls the first focus actuator 33a and the second focus actuator 33b in an independent manner, based on the importance degree information obtained as described above, and adjusts a focus state of the first optical system 21 and a focus state of the second optical system 22.

In other words, in a case where the importance degree information indicates that the degree of importance of the wide-angle image (first captured image) is higher than that of the telephotographic image (second captured image), the focus controller 34 controls the focus adjustment unit 32 (second focus actuator 33b) so that the second optical system 22 enters a defocus state. In this case, the focus state of the first optical system 21 is adjusted by the first focus actuator 33a controlled by the focus controller 34, so that the wide-angle image is captured in a desired focusing state.

On the other hand, in a case where the importance degree information indicates that the degree of importance of the telephotographic image (second captured image) is higher than that of the wide-angle image (first captured image), the focus controller 34 controls the focus adjustment unit 32 (first focus actuator 33a) so that the first optical system 21 enters a defocus state. In this case, the focus state of the second optical system 22 is adjusted by the second focus actuator 33b controlled by the focus controller 34, and the telephotographic image is captured in a desired focusing state.

In a case where the importance degree information directly or indirectly indicates that "there is no difference between the degree of importance of the wide-angle image (first captured image) and the degree of importance of the telephotographic image (second captured image)", a normal focus control using the focus adjustment unit 32 is performed, and the wide-angle image and the telephotographic image are captured in a desired focusing state.

Here, the focus control for causing "the first optical system 21 to enter a defocus state" and the focus control for causing "the second optical system 22 to enter a defocus state" are performed so that an unnecessary image (particularly, an edge component) is not easily noticed. Accordingly, for example, by causing the first optical system 21 or the second optical system 22 to enter a defocus state, the amount of blur of an unnecessary image may be adjusted to become equal to or greater than a specific amount which is determined according to a pixel pitch of the imaging element 24 (light-receiving sensors 25). More specifically, the defocus state of the first optical system 21 may be realized by setting a full width at half maximum (FWHM) of a point spread function (PSM) of the first optical system 21 to become equal to or greater than a pixel pitch of the plural light-receiving sensors 25 that form the imaging element 24 by controlling the focus adjustment unit 32 (first focus actuator 33a) by the focus controller 34. Similarly, the defocus state of the second optical system 22 may be realized by setting a full width at half maximum (FWHM) of a point spread function (PSM) of the second optical system 22 to become equal to or greater than a pixel pitch of the plural light-receiving sensors 25 that form the imaging element 24 by controlling the focus adjustment unit 32 (second focus actuator 33b) by the focus controller 34.

FIGS. 12A and 12B are diagrams illustrating a general point spread phenomenon of an imaging optical system 11 (lens), in which FIG. 12A is a sectional view schematically showing a system in which light from a point light source 48 reaches the imaging element 24 through the imaging optical system 11, and FIG. 12B is a diagram schematically showing a point spread function (PSF) of light received by the imaging element 24. FIG. 13 is a diagram illustrating a full width at half maximum (FWHM) of the point spread function (PSF) shown in FIG. 12B. The point spread function (PSF) of the imaging optical system 11 is a function indicating an impulse response with respect to the point light source 48, and shows a resolution of the imaging optical system 11. FIG. 12B and FIG. 13 show a point spread function (PSF) that represents the brightness of light (light intensity: h(x)) from the point light source 48, received by the imaging element 24 (light-receiving sensors 25) in a one-dimensional direction (x direction).

The focus controller 34 may realize the defocus state of the first optical system 21 or the second optical system 22 by setting the full width at half maximum (FWHM, see FIG. 13) of the point spread function (PSF) of the first optical system 21 or the second optical system 22 to be equal to or greater than the pixel pitch of the light-receiving sensors 25 by controlling the focus adjustment unit 32 (the first focus actuator 33a and the second focus actuator 33b).

The defocus state of the first optical system 21 and the defocus state of the second optical system 22 may be realized based on other standards. For example, The defocus state of the first optical system 21 or the second optical system 22 may be realized by setting a focusing position of an optical system used for imaging of an "unnecessary image" to the closest position or the most distant telephotographic position in a range where the focusing position can be adjusted by the focus adjustment unit 32 (the first focus actuator 33a and the second focus actuator 33b). In this case, it is preferable that the first optical system 21 or the second optical system 22 is adjusted to a defocus state by setting the focusing position of the optical system used for capturing an "unnecessary image" to a position where the amount of blur of "the unnecessary image" becomes a maximum.

Next, a processing flow relating to a focus control of the imaging optical system 11 (the first optical system 21 and the second optical system 22) in this embodiment will be described.

Figure 14:
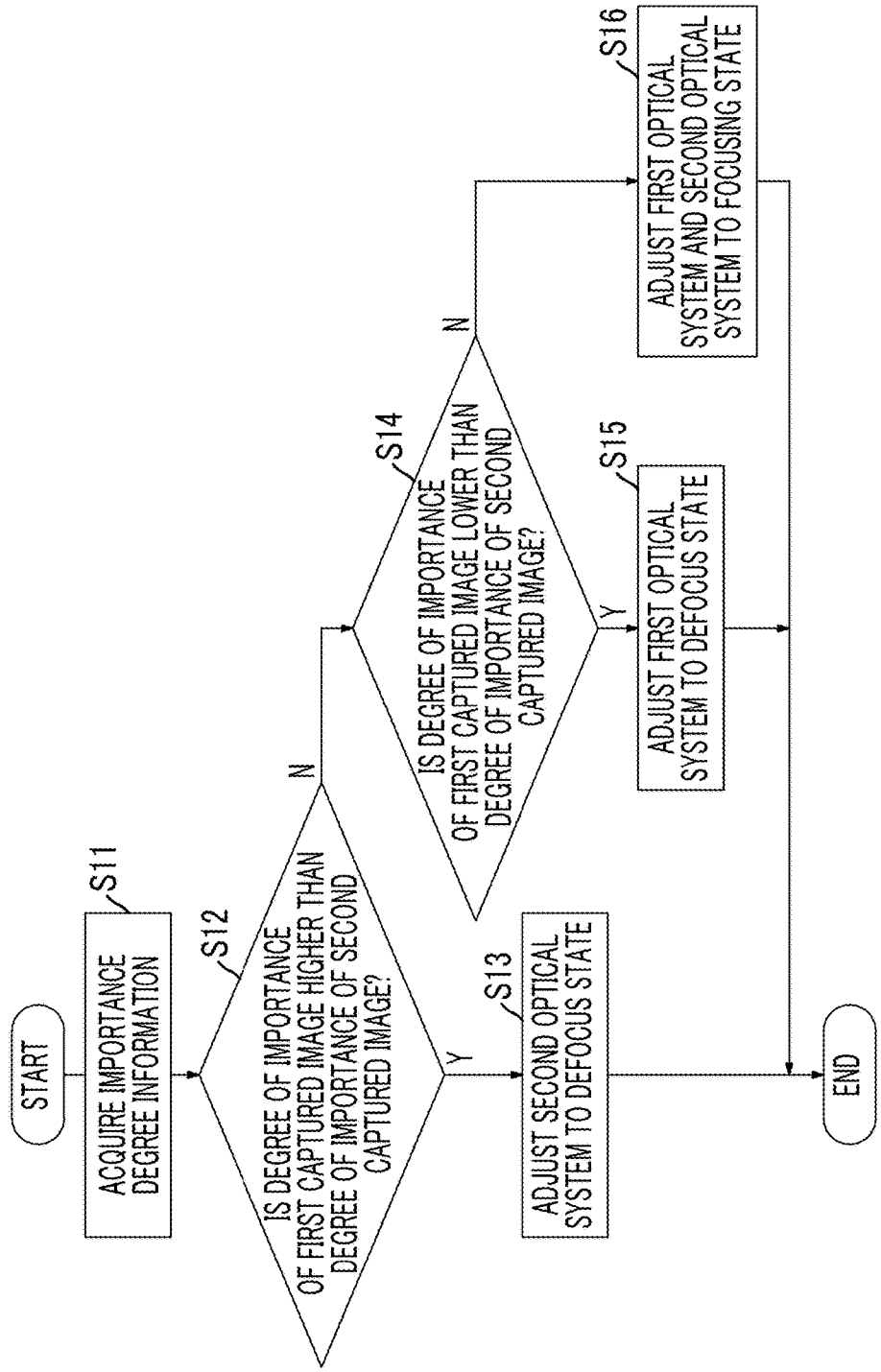
FIG. 14 is a flowchart illustrating an example of a focus control (imaging method) of the imaging optical system (the first optical system and the second optical system) according to the first embodiment.

FIG. 14 is a flowchart illustrating an example of a focus control (imaging method) of the imaging optical system 11 (the first optical system 21 and the second optical system 22) according to the first embodiment.

First, importance degree information indicating the degrees of importance of a first captured image (wide-angle image) and a second captured image (telephotographic image) is acquired by the focus controller 34 (step S11 in FIG. 14). The focus adjustment unit 32 is controlled by the focus controller 34 based on the importance degree information, so that a focus state of the imaging optical system 11 (the first optical system 21 and the second optical system 22) is controlled.

In other words, in a case where the degree of importance of the first captured image (wide-angle image) is higher than that of the second captured image (telephotographic image) (Y in S12), the focus controller 34 controls the second focus actuator 33b so that the second optical system 22 used for capturing of the second captured image (telephotographic image) is adjusted to a defocus state (S13). In this case, the focus controller 34 controls the first focus actuator 33a so that the first optical system 21 used for capturing of the first captured image (wide-angle image) is adjusted to a focusing state.

On the other hand, in a case where the degree of importance of the first captured image (wide-angle image) is not higher than that of the second captured image (telephotographic image) (N in S12), and in a case where the degree of importance of the second captured image (telephotographic image) is higher than that of the first captured image (wide-angle image) (Y in S14), the focus controller 34 controls the first focus actuator 33a so that the first optical system 21 used for capturing of the first captured image (wide-angle image) is adjusted to a defocus state (S15). In this case, the focus controller 34 controls the second focus actuator 33b so that the second optical system 22 used for capturing of the second captured image (telephotographic image) is adjusted to a focusing state.

In a case where the degree of importance of the first captured image (wide-angle image) is not higher than that of the second captured image (telephotographic image) and the degree of importance of the second captured image (telephotographic image) is not higher than that of the first captured image (wide-angle image) (N in S14), the focus controller 34 controls the first focus actuator 33a and the second focus actuator 33b so that the first optical system 21 and the second optical system 22 are adjusted to a focusing state (S16).

An optical system having a low degree of importance among the first optical system 21 and the second optical system 22 having independent characteristics is adjusted to a defocus state according to the series of focus controls described above to perform imaging. Thus, as shown in FIGS. 9 and 10, the influence of interference (crosstalk) of imaging light is reduced, and thus, it is possible to effectively reduce deterioration in visibility of an image captured by an optical system having a high degree of importance.

As described above, according to the present embodiment, the focus states of the first optical system 21 and the second optical system 22 are controlled based on the importance degree information, and thus, it is possible to reduce the influence of interference of imaging light between the first optical system 21 and the second optical system 22 according to actual imaging situations.

In particular, the above-described imaging controls may be conveniently realized at low cost using an existing apparatus configuration, and may be realized by a simplified processing configuration without necessity of a complicated computation process.

Second Embodiment

In this embodiment, the same reference numerals are given to the same or similar components as those of the above-described first embodiment, and detailed description thereof will not be repeated.

An imaging device 30 according to this embodiment has the same apparatus configuration as that of the imaging device 30 according to the above-described first embodiment, and a first optical system 21 or a second optical system 22 used for capturing an image having a relatively low degree of importance among a wide-angle image (first captured image) and a telephotographic image (second captured image) is adjusted to a defocus state on purpose based on importance degree information similar to the above-described first embodiment, so that image quality of an image having a relatively high degree of importance is enhanced (see FIGS. 9 and 10).

Further, in this embodiment, an image correction unit 39 (see FIG. 11) corrects a wide-angle image (first captured image) and a telephotographic image (second captured image), reduces the influence of light passed through the second optical system 22 in the wide-angle image, and reduces the influence of light passed through the first optical system 21 in the telephotographic image. In other words, the image correction unit 39 performs a correction process of wide-angle image data and telephotographic image data acquired from an image generation unit 36 or an image storage unit 40, to thereby reduce the influence of a "telephotographic image component mixed into a wide-angle image (in other words, a component of imaging light of a telephotographic image passed through the second optical system 22 and received by the first light-receiving sensors 25a)" or the influence of a "wide-angle image component mixed into the telephotographic image (in other words, a component of imaging light of a wide-angle image passed through the first optical system 21 and received by the second light-receiving sensors 25b)".

Specific methods of the correction process performed in the image correction unit 39 are not particularly limited. For example, the image correction unit 39 may perform the correction process of the wide-angle image and the telephotographic image based on an inverse matrix of a matrix formed by detection gain distributions and radio interference gain distributions of the wide-angle image (first captured image) and the telephotographic image (second captured image).

Hereinafter, a specific example of an image correction process based on an inverse matrix of a matrix formed by detection gain distributions and radio interference gain distributions will be described.

Figure 15:
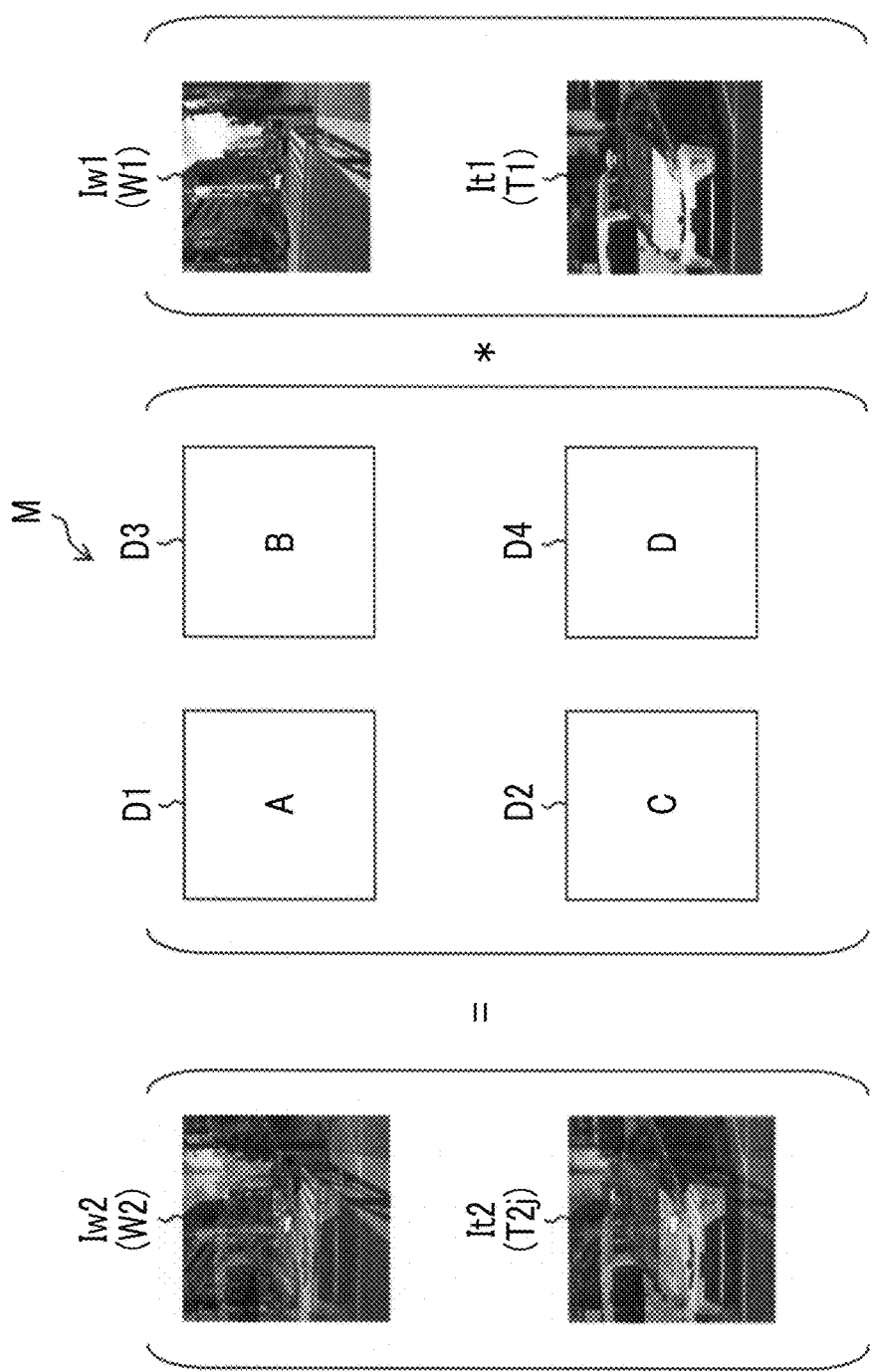
FIG. 15 is a diagram illustrating a matrix relationship configured by a true wide-angle image, a true telephotographic image, an output wide-angle image, an output telephotographic image, a detection gain distribution, and a radio interference gain distribution.

FIG. 15 is a diagram illustrating a relationship of a matrix M formed by a true wide-angle image Iw1, a true telephotographic image It1, an output wide-angle image Iw2, an output telephotographic image It2, detection gain distributions, and radio interference gain distributions. "The true wide-angle image Iw1, the true telephotographic image It1, the output wide-angle image Iw2 and the output telephotographic image It2" shown in FIG. 15 correspond to "the true wide-angle image Iw1, the true telephotographic image It1, the output wide-angle image Iw2 and the output telephotographic image It2" shown in FIGS. 8 to 10, respectively.

The wide-angle image Iw2 and the output telephotographic image It2 which are generated from imaging signals output from an imaging element 24 (first light-receiving sensors 25a and second light-receiving sensors 25b) are represented as a product of "the matrix M formed by the detection gain distributions and the radio interference gain distributions" and "the true wide-angle image Iw1 and the true telephotographic image It1 which are an original wide-angle image and an original telephotographic image generated by imaging light respectively passed through the first optical system 21 and the second optical system 22", as shown in FIG. 15.

The matrix M formed by the detection gain distributions and the radio interference gain distributions is a matrix of 2×2 formed by a wide-angle detection gain distribution D1, a wide-angle radio interference gain distribution D2, a telephotographic radio interference gain distribution D3, and a telephotographic detection gain distribution D4, as shown in FIG. 15. "The wide-angle detection gain distribution D1, the wide-angle radio interference gain distribution D2, the telephotographic radio interference gain distribution D3, and the telephotographic detection gain distribution D4" shown in FIG. 15 correspond to the wide-angle detection gain distribution D1, the wide-angle radio interference gain distribution D2, the telephotographic radio interference gain distribution D3, and the telephotographic detection gain distribution D4 shown in FIGS. 8 to 10, respectively.

Figure 16:
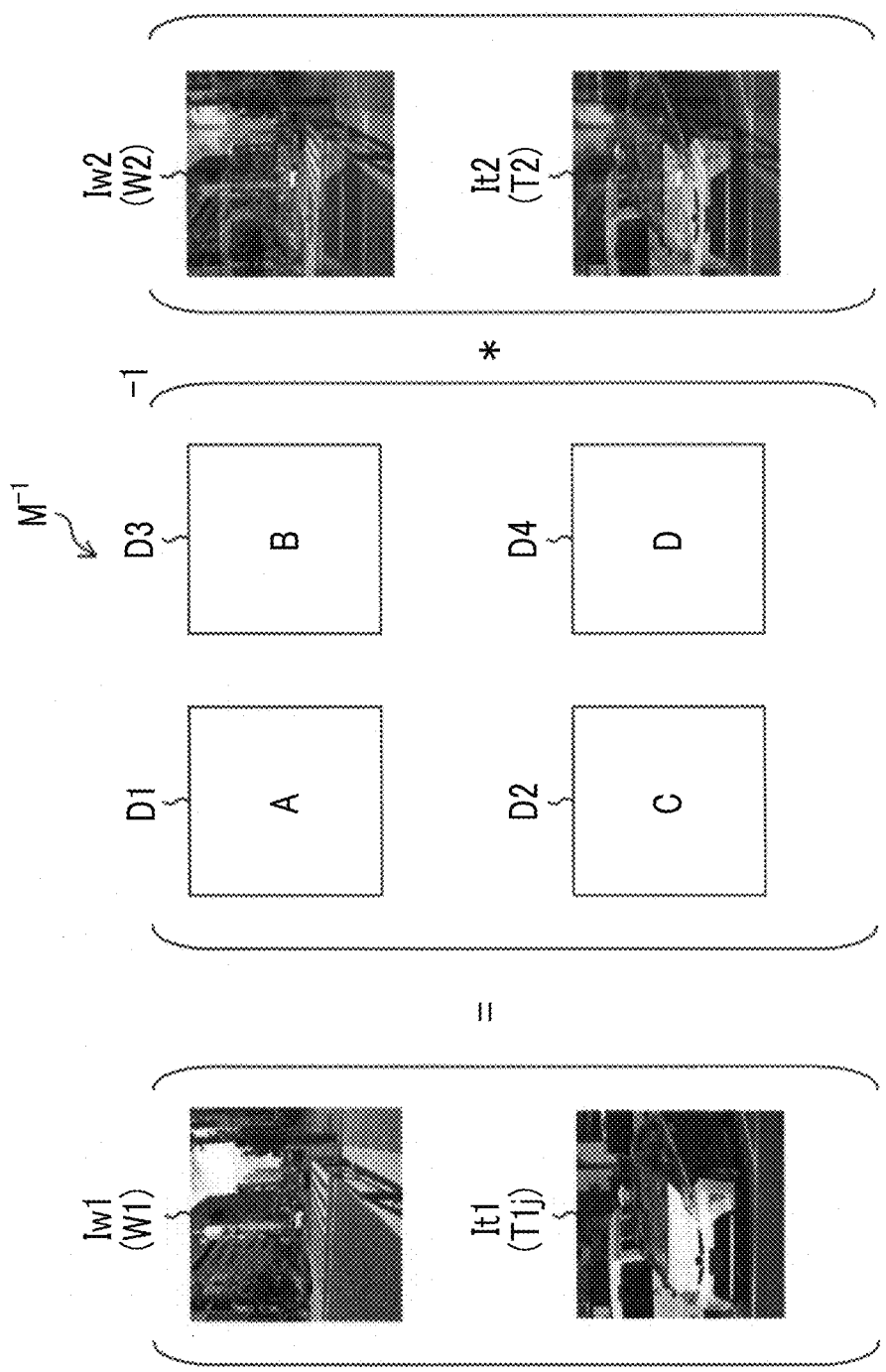
FIG. 16 is a diagram showing a determinant obtained by applying an inverse matrix of a "matrix formed by detection gain distributions and radio interference gain distributions" to the determinant shown in FIG. 15.

FIG. 16 is a diagram showing a determinant obtained by applying an inverse matrix $M^{-1}$ of "the matrix M formed by the detection gain distributions and the radio interference gain distributions" to a determinant shown in FIG. 15. As shown in FIG. 16, it is possible to acquire "the true wide-angle image Iw1 and the true telephotographic image It1 which are the original wide-angle image and the original telephotographic image" by a product of the inverse matrix $M^{-1}$ of "the matrix M formed by the detection gain distributions and the radio interference gain distributions" and "the output wide-angle image Iw2 and the output telephotographic image It2 which are generated from the imaging signals output from the imaging element 24 (first light-receiving sensors 25a and second light-receiving sensors 25b)", as shown in FIG. 16.

FIG. 17 shows a determinant that simply represents the determinant shown in FIG. 16. In FIG. 17, "W1" collectively represents pixel components (pixel values) of the true wide-angle image Iw1, "T1" collectively represents pixel components of the true telephotographic image It1, "W2" collectively represents pixel components of the output wide-angle image Iw2, and "T2" collectively represents pixel components of the output telephotographic image It2. In FIG. 17, "A", "B", "C", and "D" collectively represent elements that form the wide-angle detection gain distribution D1, the telephotographic radio interference gain distribution D3, and the wide-angle radio frequency gain distribution D2, and the telephotographic detection gain distribution D4, respectively.

FIG. 18 shows elements $w1\_11$ to $w1\_mn$ that form "W1 shown in FIG. 17. In other words, "W1" is formed by the elements $w1\_11$ to $w1\_mn$ corresponding to the pixel components (pixel values) of the true wide-angle image Iw1. Here, "m" and "n" represent an integer which is equal to or greater than 2, respectively, in which "m" and "n" may be the same, or may be different from each other.

Similarly, "W2", "T1", and "T2" shown in FIG. 17 are formed by elements w2_11 to W2_mn, t1_11 to t1_mn, and t2_11 to t2_nm corresponding to the pixel components (pixel value) the output wide-angle image Iw2, the true telephotographic image It1, and the output telephotographic image It2, respectively (not shown). Further, "A", "B", "C", and "D" shown in FIG. 17 are formed by elements a11 to amn, b11 to bmn, c11 to cmn, and d11 to dmn according to respective pixels of a wide-angle image and a telephotographic image, respectively (not shown).

FIG. 19 shows a calculation formula of "w1_ij" derived based on the determinant shown in FIG. 17. FIG. 20 shows a calculation formula of "t1_ij" derived based on the determinant shown in FIG. 17. In FIGS. 19 and 20, "i" represents an integer of 1 to m, and "j" represents an integer of 1 to n. As shown in FIGS. 19 and 20, the elements w1_11 to w1_nm corresponding to the pixel components (pixel values) of the true wide-angle image Iw1 and the elements t1_11 to t1_mn corresponding to the pixel components (pixel values) of the true wide-angle image It1, and the elements t1_11 to t1_mn corresponding to pixel components (pixel values) of the true telephotographic image It1 may be calculated through computation from the output wide-angle image Iw2 and the output telephotographic image It2, and the inverse matrix $M^{-1}$.

The image correction unit 39 according to this embodiment performs a correction process of wide-angle image data and telephotographic image data acquired from the image generation unit 36 or the image storage unit 40 based on the calculation formulas represented by FIGS. 19 and 20, to thereby reduce the influence of "the telephotographic image component mixed into the wide-angle image" or the influence of "the wide-angle image component mixed into the telephotographic image".

In terms of a strict correction process, it is preferable that each detection gain distribution and each radio interference gain distribution are formed by the same number of elements as the number of pixels that form each of the wide-angle image and the telephotographic image, and that the inverse matrix $M^{-1}$ for each element (for each corresponding pixel) that forms the detection gain distribution and the radio interference gain distribution is used in the image correction unit 39. Here, in a case where "the elements that form the detection gain distributions and the radio interference gain distributions" are approximated to "a part or all of pixels that form the wide-angle image and the telephotographic image", for example, in a case where shading is small, "the elements that form "the detection gain distributions and the radio interference gain distributions" may be represented by a common representative value in an approximation range in preferential consideration of the calculation cost. Accordingly, in a case where "all of the pixels that form the wide-angle image and the telephotographic image" are approximated, it is possible to represent the detection gain distributions and the radio interference gain distributions as a single representative value, and thus, it is possible to simply perform "the correction process based on the inverse matrix of the matrix formed by the detection gain distributions and the radio interference gain distributions" at high speed.

The matrix M (see "A", "B", "C", and "D" in FIGS. 15 to 17) based on the wide-angle detection gain distribution D1, the wide-angle radio interference gain distribution D2, the telephotographic radio interference gain distribution D3, and the telephotographic detection gain distribution D4 is determined by the imaging optical system 11 and the imaging element 24 used for imaging. The image correction unit 39 stores and retains elements of the inverse matrix $M^{-1}$ which is derived in advance from the matrix M and applies the stored and retained elements of the inverse matrix $M^{-1}$ to the output wide-angle image Iw2 and the output telephotographic image It2, to thereby make it possible to reduce the influence of imaging light of a telephotographic image in a wide-angle image, and to reduce the influence of imaging light of the wide-angle image in the telephotographic image.

Further, "the correction process based on the inverse matrix $M^{-1}$ of the matrix M formed by the detection gain distributions and the radio interference gain distributions" in the above-described image correction unit 39 is performed with respect to the wide-angle image data and the telephotographic image data acquired from the image generation unit 36 or the image storage unit 40 in the configuration example shown in FIG. 11, but the invention is not limited thereto. For example, "the correction process based on the inverse matrix of the matrix formed by the detection gain distributions and the radio interference gain distributions" in the image correction unit 39 may be performed with respect to imaging signals output from the imaging element 24 (the first light-receiving sensors 25a and the second light-receiving sensors 25b), and the image generation unit 36 may generate a wide-angle image and a telephotographic image from image data after the correction process in the image correction unit 39.

Further, "the correction process based on the inverse matrix $M^{-1}$ of the matrix M formed by the detection gain distributions and the radio interference gain distributions" in the above-described image correction unit 39 is actually performed for each of color channels that form the wide-angle image data and the telephotographic image data. The image correction unit 39 stores and retains "the inverse matrix $M^{-1}$ of the matrix M formed by the detection gain distributions and the radio interference gain distributions" relating to each of the color channels. For example, the imaging element 24 (the first light-receiving sensors 25a and the second light-receiving sensors 25b) includes R, G and B (red, green, and blue) color filters, and in a case where wide-angle image data and telephotographic image data formed by RGB data are output from the imaging element 24 as imaging signals, the image correction unit 39 retains "the inverse matrix $M^{-1}$ of the matrix M formed by the detection gain distributions and the radio interference gain distributions" relating to each color channel of R, G and B for application to the output wide-angle image Iw2 and the output telephotographic image It2.

Figure 21B:
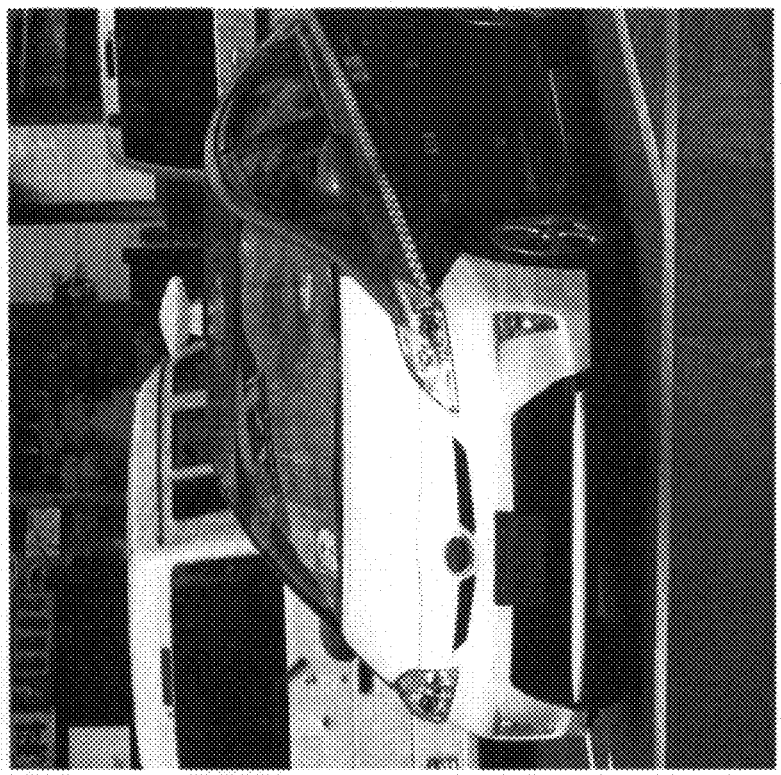
Figure 21A:
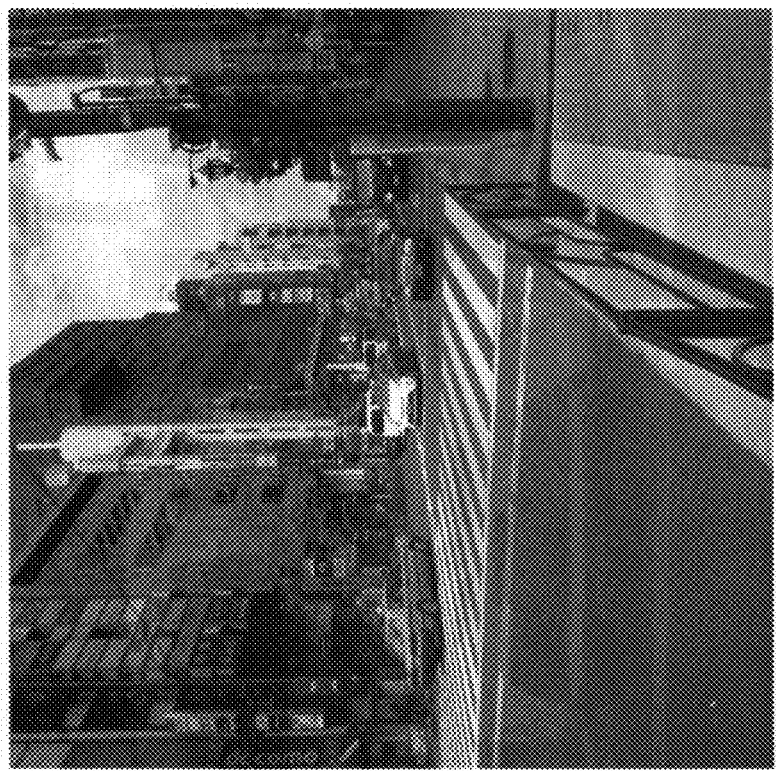
Figure 22B:
Figure 22A:
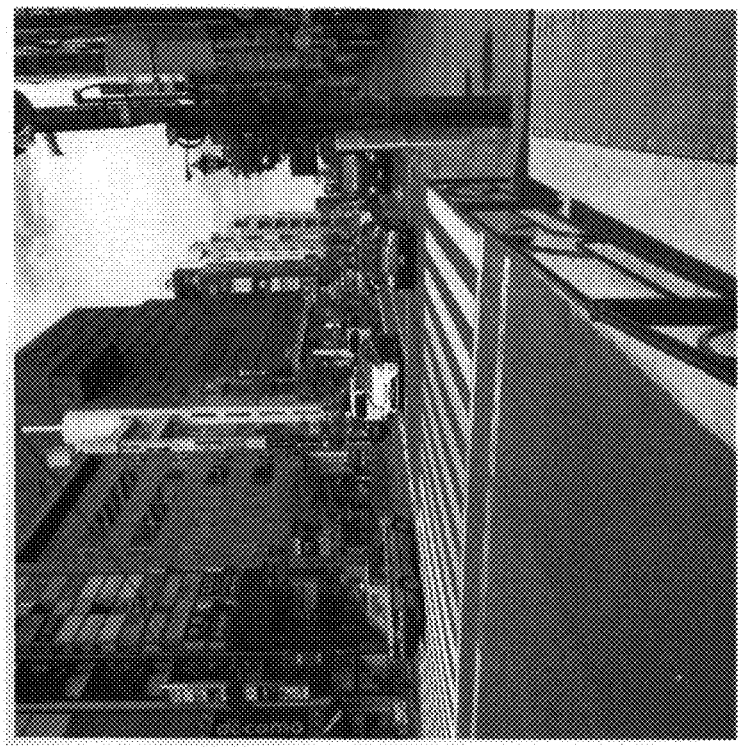

FIGS. 21A and 22B show image examples in a case where the "correction process based on the inverse matrix $M^{-1}$ of the matrix M formed by the detection gain distributions and the radio interference gain distributions" according to the second embodiment is performed without performing "the focus control of the imaging optical system 11" according to the first embodiment, in which FIG. 21A shows a wide-angle image example, and FIG. 21B shows a telephotographic image example. FIGS. 22A and 22B show image examples in a case where the "correction process based on the inverse matrix $M^{-1}$ of the matrix M formed by the detection gain distributions and the radio interference gain distributions" according to the second embodiment is performed after "the focus control of the imaging optical system 11" according to the first embodiment is performed, in which FIG. 22A shows a wide-angle image example, and FIG. 22B shows a telephotographic image example.

Accordingly, FIGS. 21A and 22A both show wide-angle image examples "in a case where the importance degree information indicates that the degree of importance of the wide-angle image (first captured image) is higher than that of the telephotographic image (second captured image)", but FIG. 21A shows a wide-angle image example in which imaging is performed in a state where the second optical system 22 for the telephotographic image is adjusted to enter a focusing state, whereas FIG. 22A shows a wide-angle image example in which imaging is performed in a state where the second optical system 22 is adjusted to enter a defocus state. On the other hand, FIGS. 21B and 22B both show telephotographic image examples "in a case where the importance degree information indicates that the degree of importance of the telephotographic image (second captured image) is higher than that of the wide-angle image (first captured image)", but FIG. 21B shows a telephotographic image example in which imaging is performed in a state where the first optical system 21 for the wide-angle image is adjusted to enter a focusing state, whereas FIG. 22B shows a telephotographic image example in which imaging is performed in a state where the first optical system 21 is adjusted to enter a defocus state.

In the wide-angle image example shown in FIG. 21(a), mixture of bright pixel components among telephotographic image components is slightly noticeable. Further, in the telephotographic image example shown in FIG. 21(b), mixture of sharp edge components among wide-angle image components is slightly noticeable. On the other hand, in the wide-angle image example shown in FIG. 22A and the telephotographic image example shown in FIG. 22B according to this embodiment, the noticeable mixture components in the wide-angle image example shown in FIG. 21A and the telephotographic image example shown in FIG. 21B are reduced, so that high-quality images having excellent visibility as a whole are formed.

As described above, by performing "the correction process based on the inverse matrix of the matrix formed by the detection gain distributions and the radio interference gain distributions" according to the above-described second embodiment" in addition to "the focus control of the imaging optical system 11 (the first optical system 21 and the second optical system 22)" according to the above-described first embodiment, it is possible to acquire desired images of high image quality (see FIGS. 22A and 22B).

In particular, "the correction process based on the inverse matrix $M^{-1}$ of the matrix M formed by the detection gain distributions and the radio interference gain distributions" according to the above-described second embodiment may be suitably combined with "the focus control of the imaging optical system 11" according to the above-described first embodiment. In other words, since interference light (unnecessary imaging light) in which high-frequency components are eliminated by "the focus control of the imaging optical system 11" according to the above-described first embodiment is received by the imaging element 24 (the first light-receiving sensors 25a or the second light-receiving sensors 25b), an elimination error due to "the correction process" according to the second embodiment is not easily noticed. Accordingly, by combining "the correction process based on the inverse matrix $M^{-1}$ of the matrix M formed by the detection gain distributions and the radio interference gain distributions" according to the second embodiment with "the focus control of the imaging optical system 11" according to the first embodiment, it is possible to achieve an advantage of image quality improvement due to elimination of interference light (unnecessary imaging light) based on "the correction process" according to the second embodiment while reducing a risk of image quality deterioration due to "the correction process" according to the second embodiment.

Third Embodiment

In this embodiment, the same reference numerals are given to the same or similar components as those of the above-described first embodiment, and detailed description thereof will not be repeated.

In the above-described first embodiment, the imaging device 30 that includes the first optical system 21 and the second optical system 22 having different "focal distances" is shown, but the invention may also be applied to the imaging device 30 that includes the first optical system 21 and the second optical system 22 having different optical characteristics. In this embodiment, an example of the imaging device 30 that includes the first optical system 21 and the second optical system 22 having different "focusing distances" will be described.

Figure 23:
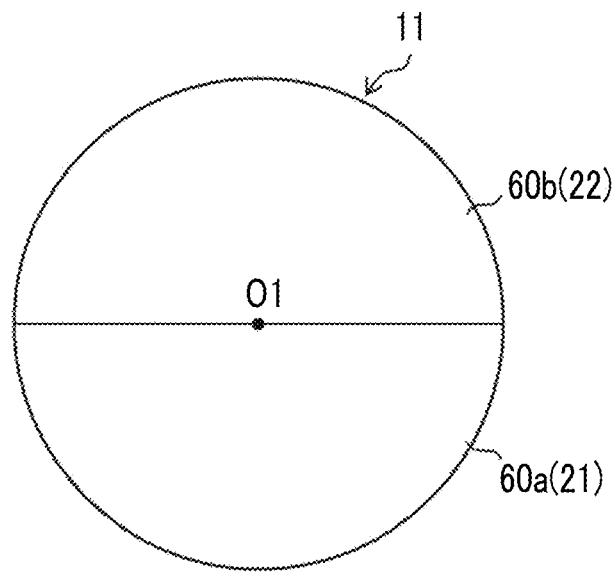
FIG. 23 is a diagram showing an appearance of an imaging optical system according to a third embodiment.

FIG. 23 is a diagram showing an appearance of an imaging optical system 11 according to the third embodiment.

The imaging optical system 11 according to this embodiment includes a region 60a having a relatively long focusing distance (hereinafter, referred to as a "long-distance focusing region") and a region 60b having a focusing distance shorter than that of the long-distance focusing region 60a (hereinafter, referred to as a "short-distance focusing region"), which have lens shapes. Among the plural regions (the long-distance focusing region 60a and the short-distance focusing region 60b) of the imaging optical system 11 which are integrally formed, a first region (long-distance focusing region 60a) is formed by the first optical system 21, and a second region (short-distance focusing region 60b) is formed by the second optical system 22. In the example shown in FIG. 23, from a front view of the imaging optical system 11, a semi-lunar region on a lower side with reference a horizontal boundary including a lens center O1 is the long-distance focusing region 60a which corresponds to the first optical system 21, and a semi-lunar region on an upper side is the short-distance focusing region 60b which corresponds to the second optical system 22. In this example, the first optical system 21 (long-distance focusing region 60a) and the second optical system 22 (short-distance focusing region 60b) have the same focal distance, but may have different focal distances. Namely, the first optical system 21 and the second optical system 22 may be different from each other in at least one of focal distances or focusing distances, and various feature values of the first optical system 21 and the second optical system 22 may be the same or may be different from each other. Specific feature values may be set according to imaging purposes, imaging conditions, or the like.

In the example shown in FIG. 23, the first optical system 21 and the second optical system 22 are formed in the semi-lunar shapes, but the shapes of the first optical system 21 and the second optical system 22 are not particularly limited. For example, the first optical system 21 and the second optical system 22 that form a concentric circle may be used, and one of the first optical system 21 and the second optical system 22 may be set as a circular region centering around the lens center O1, and the other one thereof may be set as a surrounding annular region. Further, a surface area ratio and a volume ratio between the first optical system 21 and the second optical system 22 are not also particularly limited.

By using the imaging optical system 11 with such a configuration, the imaging device 30 according to this embodiment is capable of acquiring two types of images having different focal distances at the same time.

Figure 24:
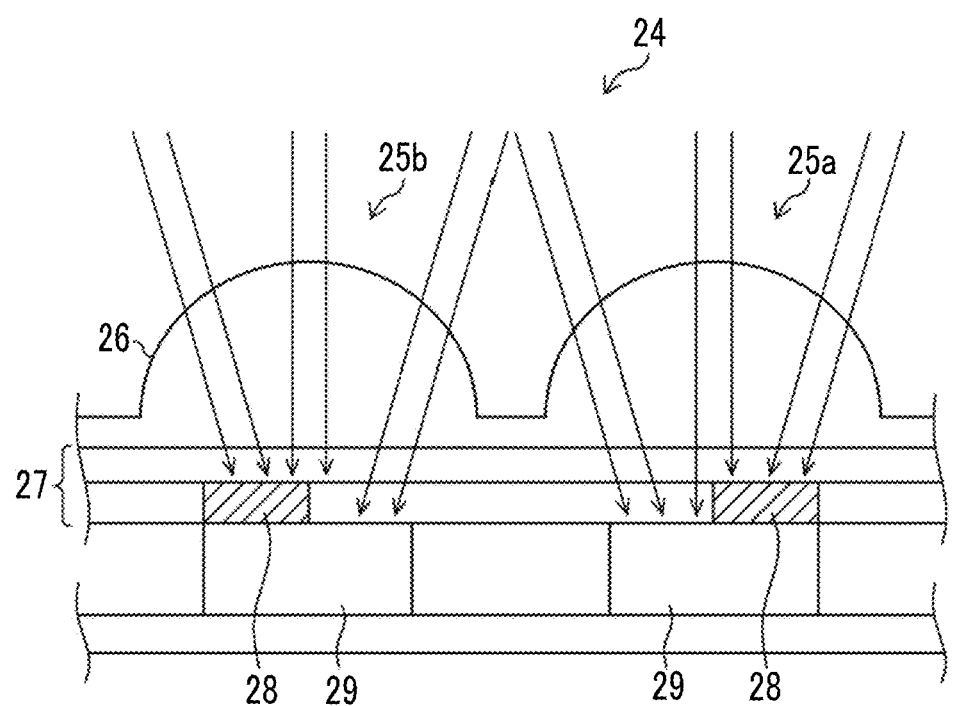
FIG. 24 is an enlarged sectional view showing a part of the imaging element according to the third embodiment.

FIG. 24 is an enlarged sectional view showing a part of the imaging element 24 of the third embodiment. Each light-receiving sensor 25 of the imaging element 24 according to this embodiment has fundamentally the same configuration as that of each light-receiving sensor 25 of the imaging element 24 according to the above-described first embodiment, but a light shielding mask 28 of this embodiment is disposed to cover a half of a light-receiving surface of a photodiode 29. Namely, the light shielding mask 28 of a first light-receiving sensor 25a is disposed to cover one of light-receiving surfaces obtained by dividing the photodiode 29 into two, and the light shielding mask 28 of a second light-receiving sensor 25b is disposed to cover the other one of the light-receiving surfaces obtained by dividing the photodiode 29 into two. Unnecessary imaging light is blocked by the light shielding masks 28 having such a disposition so that pupil splitting is performed, imaging light passed through the first optical system 21 is received by the first light-receiving sensor 25a, and imaging light passed through the second optical system 22 is received by the second light-receiving sensor 25b.

It is preferable that a ratio between the numbers of the first light-receiving sensors 25a and the second light-receiving sensors 25b is the same as a ratio between the areas of light-receiving surfaces of imaging light in the first optical system 21 (long-distance focusing region 60a) and the second optical system 22 (short-distance focusing region 60b). Accordingly, in a case where the areas of the light-receiving surfaces of the first optical system 21 and the second optical system 22 are the same, it is preferable that the numbers of the first light-receiving sensor 25a and the second light-receiving sensor 25b are the same. In addition, it is preferable that the first light-receiving sensors 25a and the second light-receiving sensors 25b are disposed so that image quality does not deteriorate in a specific region of an image to be generated and in a specific direction therein. Further, by mixing the first light-receiving sensors 25a and the second light-receiving sensors 25b, it is possible to compensate for pixel data omission using an interpolation process, or the like.

Figure 25:
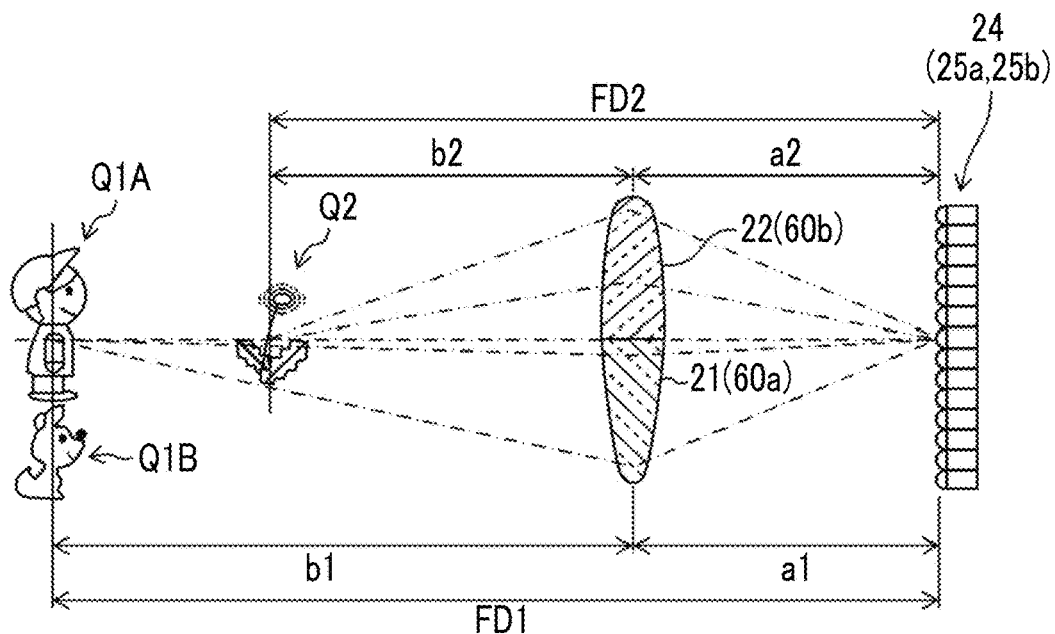
FIG. 25 is a diagram illustrating an imaging mechanism using the imaging optical system according to the third embodiment.

FIG. 25 is a diagram illustrating an imaging mechanism using the imaging optical system 11 according to the third embodiment.

In FIG. 25, details indicated by respective reference numerals are as follows.

a1: distance between lens of the first optical system 21 (long-distance focusing region 60a) and light-receiving surface a2: distance between lens of the second optical system 22 (short-distance focusing region 60b) and light-receiving surface b1: distance between lens of the first optical system 21 (long-distance focusing region 60a) and a subject b2: distance between lens of the second optical system 22 (short-distance focusing region 60b) and a subject FD1: focusing distance of the first optical system 21 (long-range focusing region 60a)

FD2: focusing distance of the second optical system 22 (short-distance focusing region 60b)

Q1A, Q1B, and Q2: Subject

In this embodiment, "the focal distance" represents a distance from a light-receiving surface of the light-receiving sensor 25 of the imaging element 24 to a subject which is in a focusing relationship with respect to the light-receiving sensor 25, and in the example shown in FIG. 25, relationships of "FD1=a1+b1" and "FD2=a2+b2" are established. Further, when a focal distance of the first optical system 21 (long-distance focusing region 60a) is "f1" and a focal distance of the second optical system 22 (short-distance focusing region 60b) is "f2", relationships of "1/f1=(1/a1)+(1/b1)" and "1/f2=(1/a2)+(1/b2)" are established.

In the imaging device 30 that includes "the first optical system 21 and the second optical system 22 having different focal distances", it is similarly possible to reduce the influence of interference of imaging light between the first optical system 21 and the second optical system 22 using the same configuration (see FIG. 11) as in the first embodiment, according to actual imaging situations. Namely, the focus adjustment unit 32 is controlled by the focus controller 34 based on importance degree information, and thus, a focus state of the imaging optical system 11 (the first optical system 21 and the second optical system 22) is controlled.

"The adjustment of the focus state of the imaging optical system 11 (the first optical system 21 and the second optical system 22) by the focus adjustment unit 32" may be realized by arbitrary means. For example, in a case where the imaging optical system 11 (the first optical system 21 and the second optical system 22) is configured by a member capable of changing optical characteristics such as a focal distance by changing an applied voltage, a first focus actuator 33a and a second focus actuator 33b of the focus adjustment unit 32 may realize a "defocus state" and a "focusing state" of the first optical system 21 and the second optical system 22 by adjusting a voltage to be applied to the first optical system 21 and the second optical system 22. Further, the first focus actuator 33a and the second focus actuator 33b of the focus adjustment unit 32 may realize "the defocus state" of the first optical system 21 and the second optical system 22 by providing an "optical member for shading off a captured image" on an optical path as necessary. In a case where the first optical system 21 (long-distance focusing region 60a) and the second optical system 22 (short-distance focusing region 60b) have a separated structure, the first focus actuator 33a and the second focus actuator 33b of the focus adjustment unit 32 may realize "the defocus state" and "the focusing state" by driving the first optical system 21 and the second optical system 22 in an independent manner to adjust disposition.

Other Modification Examples

The invention is not limited to the above-described embodiments and modification examples thereof, and may include various modifications in a range without departing from the concept of the invention.

For example, the above-described embodiments may be appropriately combined, or "the correction process based on the inverse matrix of the matrix formed by the detection gain distributions and the radio interference gain distributions" according to the above-described second embodiment may be applied to the imaging device 30 according to the above-described third embodiment that includes "the first optical system 21 and the second optical system 22 having different foal distances".

In addition, in the above-described embodiments, an example in which the imaging optical system 11 is configured by two types of optical systems (first optical system 21 and second optical system 22) is shown, but the imaging optical system 11 may be configured by three or more types of optical systems.

Further, the above-described configurations and functions may be appropriately realized by arbitrary hardware, software, or combinations thereof. For example, the invention may be applied to a program that causes a computer to execute the above-described processing steps (processing procedure), a computer readable recording medium (non-temporary recording medium) on which such a program is recorded, or a computer in which such a program can be installed.

Furthermore, embodiments to which the invention can be applied are not limited to the digital camera 10 shown in FIG. 1 and the automatic tracking imaging device 14 shown in FIG. 2, and the invention may be applied to cameras in which imaging is a main function, and to mobile devices that include functions (call function, communication function, and other computer functions) other than the imaging function, in addition to the imaging function. As another embodiment to which the invention can be applied, for example, a mobile phone, a smartphone, a personal digital assistants (PDA) and a mobile game player having a camera function may be used. Hereinafter, an example of a smartphone to which the invention can be applied will be described.

<Configuration of Smartphone>

Figure 26:
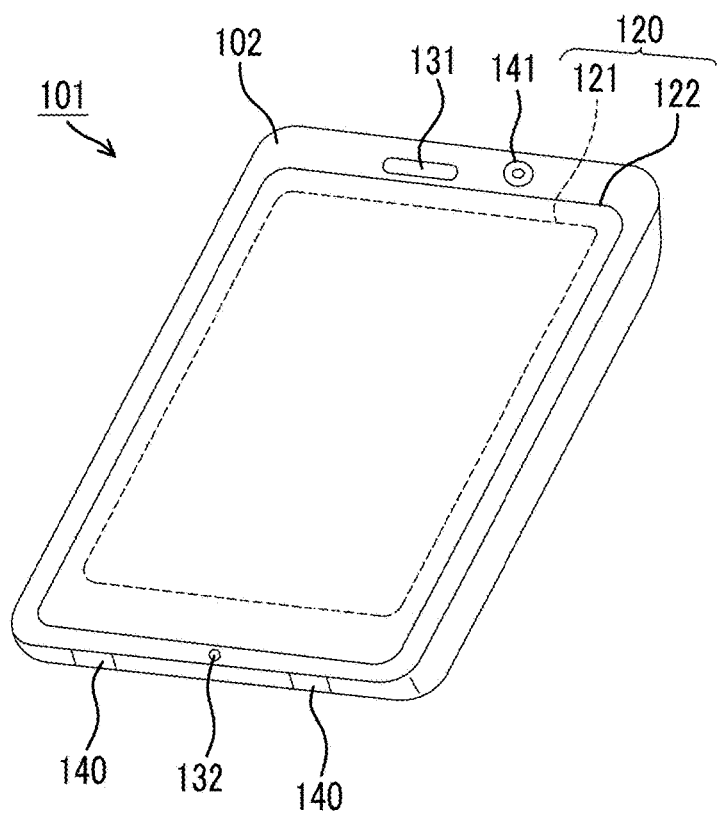
FIG. 26 is a diagram showing an appearance of a smartphone which is an embodiment of an imaging device of the invention.

FIG. 26 is a diagram showing an appearance of a smartphone 101 which is an embodiment of an imaging device of the invention. The smartphone 101 shown in FIG. 26 includes a flat housing 102, and a display input unit 120 that is disposed on one surface of the housing 102 and includes a display panel 121 which is a display unit and an operation panel 122 which is an input unit, in which the display panel 121 and the operation panel 122 are integrally formed. Further, the housing 102 includes a speaker 131, a microphone 132, an operation unit 140, and a camera unit 141. The configuration of the housing 102 is not limited thereto, and for example, a configuration in which a display unit and an input unit are provided in an independent manner may be employed, or a configuration in which a folding structure or a slide mechanism is provided may also be employed.

Figure 27:
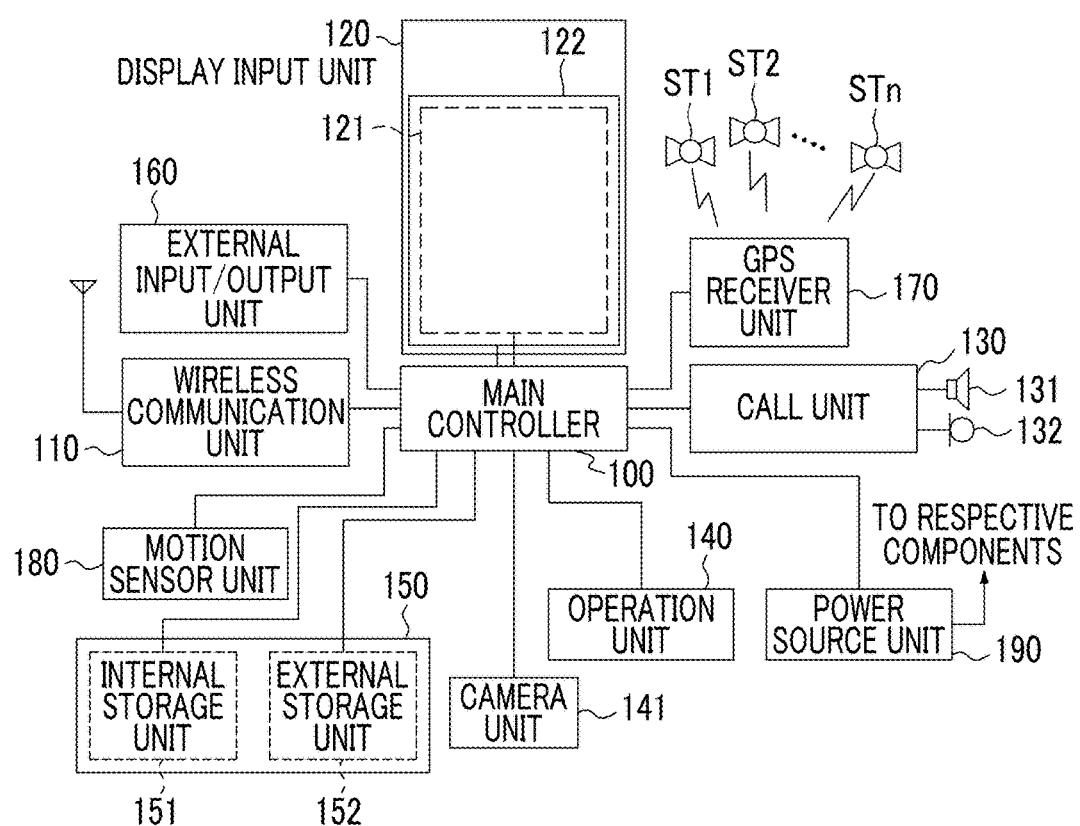
FIG. 27 is a block diagram showing a configuration of the smartphone shown in FIG. 26.

FIG. 27 is a block diagram showing a configuration of the smartphone 101 shown in FIG. 26. As shown in FIG. 27, as main components of the smartphone 101, a wireless communication unit 110, the display input unit 120, a call unit 130, the operation unit 140, the camera unit 141, a storage unit 150, an external input/output unit 160, a global positioning system (GPS) receiver unit 170, a motion sensor unit 180, a power source unit 190, and a main controller 100 are provided. Further, as main functions of the smartphone 101, a wireless communication function for performing mobile wireless communication with a base station device through a mobile communication network.

The wireless communication unit 110 performs wireless communication with the base station device connected to the mobile communication network according to an instruction of the main controller 100. Using the wireless communication, the wireless communication unit 110 performs transmission and reception of a variety of file data such as sound data or image data, e-mail data, or the like, and performs reception of Web data, streaming data, or the like.

The display input unit 120 is a so-called touch panel that includes a display panel 121 and an operation panel 122, displays an image (a still image and a moving image), character information, or the like under the control of the main controller 100 to visually transmit information to a user, and detects a user operation with respect to the displayed information.

The display panel 121 uses a liquid crystal display (LCD), an organic electro-luminescence display (OLED), or the like as a display device. The operation panel 122 is a device that is provided so that an image displayed on a display surface of the display panel 121 can be visually recognized and detects one or plural sets of coordinates operated by a user's finger or a stylus. If the device is operated by a user's finger or a stylus, the operation panel 122 outputs a detection signal generated due to the operation to the main controller 100. Then, the main controller 100 detects an operation position (coordinates) on the display panel 121 based on the received detection signal.

As an embodiment of the imaging device of the invention, a configuration in which the display panel 121 and the operation panel 122 of the smartphone 101 shown as an example in FIG. 26 are integrated to form the display input unit 120 and the operation panel 122 is disposed to completely cover the display panel 121 may be used. In a case where such a configuration is employed, the operation panel 122 may have a function of detecting a user operation in a region out of the display panel 121. In other words, the operation panel 122 may include a detection region with respect to a portion that overlaps the display panel 121 (hereinafter, referred to as a "display region"), and a detection region with respect to an outer edge portion that does not overlap the display panel 121 (hereinafter, referred to as a "non-display region").

The size of the display region and the size of the display panel 121 may be completely the same, but it is not essential that both of the sizes are the same. Further, the operation panel 122 may include two sensitive regions of an outer edge portion and an inner portion other than the outer edge portion. Further, the width of the outer edge portion is appropriately designed according to the size of the housing 102, or the like. Furthermore, as a position detection method employed in the operation panel 122, any one of a matrix switch type, a resistive film type, a surface acoustic wave type, an infrared type, an electromagnetic induction type, an electrostatic capacitance type, and the like may be employed.

The call unit 130 includes the speaker 131 and the microphone 132. The call unit 130 converts user's voice input through the microphone 132 into voice data capable of being processed by the main controller 100 and outputs the result to the main controller 100, or decodes voice data received by the wireless communication unit 110 or the external input/output unit 160 and outputs the result through the speaker 131. Further, as shown in FIG. 26, for example, the speaker 131 may be mounted on the same surface as the surface where the display input unit 120 is provided, and the microphone 132 may be mounted on a side surface of the housing 102.

The operation unit 140 is a hardware key using a key switch or the like, and receives an instruction from a user. For example, as shown in FIG. 26, the operation unit 140 is a push button switch that is mounted on a side surface of the housing 102 of the smartphone 101, is turned on when being pressed by a finger or the like, and is turned off by a restoring force of a spring or the like when the finger is separated.

The storage unit 150 stores a control program or control data of the main controller 100, application software, address data in which a name, a telephone number, and the like of a communication partner are associated with each other, data on transmitted or received e-mails, Web data downloaded by a Web browser, or data on downloaded content, and temporarily stores streaming data or the like. Further, the storage unit 150 includes an internal storage section 151 provided in the smartphone, and an external storage section 152 provided with an attachable and detachable external memory slot. Each of the internal storage section 151 and the external storage section 152 that form the storage unit 150 is realized using a storage medium such as a flash memory, a hard disk, a multimedia card micro type memory, a card type memory (for example, MicroSD (registered trademark) memory or the like), a random access memory (RAM), a read only memory (ROM), or the like.

The external input/output unit 160 serves as an interface with respect to all types of external devices to be connected to the smartphone 101, and is directly or indirectly connected to other external devices through communication or the like (for example, Universal Serial Bus (USB), IEEE1394, or the like) or a network (for example, Internet, wireless LAN, Bluetooth (registered trademark), Radio Frequency Identification (RFID), Infrared Data Association (IrDA, registered trademark), Ultra Wideband (UWB, registered trademark), ZigBee (registered trademark), or the like).

As an external device to be connected to the smartphone 101, for example, a wired or wireless headset, a wired or wireless external charger, a wired or wireless data port, a memory card, a Subscriber Identity Module (SIM) card or a User Identity Module (UIM) card connected through a card socket, an external audio/video device connected through an audio/video input/output (I/O) terminal, an external audio/video device connected in a wireless manner, a smartphone connected in a wired or wireless manner, a personal computer connected in a wired or wireless manner, a PDA connected in a wired or wireless manner, an earphone or the like connected in a wired or wireless manner, may be used. The external input/output unit 160 may be configured to transmit received data transmitted from the external device to respective components in the smartphone 101, or to transmit data in the smartphone 101 to the external device.

The GPS receiver unit 170 receives GPS signals transmitted from GPS satellites ST1, ST2 to STn according to an instruction of the main controller 100, executes a positioning operation process based on the plural received GPS signals, and detects a position specified by the latitude, longitude and altitude of the smartphone 101. In a case where position information can be acquired from the wireless communication unit 110 and/or the external input/output unit 160 (for example, wireless LAN), the GPS receiver unit 170 can also detect the position using the position information.

The motion sensor unit 180 includes a triaxial acceleration sensor or the like, for example, and detects a physical movement of the smartphone 101 according to an instruction of the main controller 100. By detecting the physical movement of the smartphone 101, a direction and an acceleration where the smartphone 101 moves are detected. The detection result is output to the main controller 100.

The power source unit 190 supplies power accumulated in a battery (not shown) to respective units of the smartphone 101 according to an instruction of the main controller 100.

The main controller 100 includes a microprocessor, and is operated according to a control program or control data stored in the storage unit 150 to generally control the respective units of the smartphone 101. Further, the main controller 100 has a mobile communication control function for controlling respective units of a communication system and an application processing function in order to perform voice communication or data communication through the wireless communication unit 110.

The application processing function is realized as the main controller 100 is operated according to application software stored in the storage unit 150. As the application processing function, for example, an infrared communication function for controlling the external input/output unit 160 to perform data communication with an opposing device, an e-mail function for performing transmission and reception of e-mails, a Web browsing function for browsing Web pages, or the like is used.

Further, the main controller 100 has an image processing function, for example, for displaying video on the display input unit 120 based on image data (data on a still image or a moving image) such as received data or downloaded streaming data. The image processing function refers to a function for decoding the image data, performing image processing with respect to the decoded image data, and displaying an image obtained through the image processing on the display input unit 120, by the main controller 100.

In addition, the main controller 100 executes a display control with respect to the display panel 121, and an operation detection control for detecting a user operation through the operation unit 140 or the operation panel 122.

By executing the display control, the main controller 100 displays an icon for starting up application software or a software key such as a scroll bar, or displays a window for creating an e-mail. The scroll bar refers to a software key for receiving, with respect to a large image which cannot be accommodated in a display region of the display panel 121, an instruction for movement of a display portion of the image.

Further, by execution of the operation detection control, the main controller 100 detects a user operation through the operation unit 140, receives an operation with respect to the icon or an input of a character string with respect to an input section of the window, through the operation panel 122, or receives a scroll request of a display image through the scroll bar.

Furthermore, by execution of the operation detection control, the main controller 100 includes a touch panel control function for determining whether an operation position with respect to the operation panel 122 corresponds to a portion (display region) that overlaps the display panel 121 or an outer edge portion (non-display region) that does not overlap the display panel 121, and controlling a sensitive region of the operation panel 122 and a display position of a software key.

The main controller 100 may detect a gesture operation with respect to the operation panel 122, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 141 is a digital camera that performs electronic imaging using an imaging element such as a CMOS. The camera unit 141 may convert image data obtained through imaging into compressed image data such as JPEG, for example, may record the image data in the storage unit 150, or may output the image data through the external input/output unit 160 or the wireless communication unit 110, under the control of the main controller 100. In the smartphone 101 shown in FIG. 26, the camera unit 141 is mounted on the same surface as that of the display input unit 120, but the mounting position of the camera unit 141 is not limited thereto, and the camera unit 141 may be mounted on a rear surface of the housing 102, instead of the front surface of the housing 102 where the display input unit 120 is provided, or plural camera units 141 may be mounted on the housing 102. In a case where the plural camera units 141 are mounted, imaging may be performed using a single camera unit 141 while switching the plural camera units 141 to be provided for imaging, or may be performed using the plural camera units 141 at the same time.

Further, the camera unit 141 may be used for various functions of the smartphone 101. For example, an image acquired by the camera unit 141 may be displayed on the display panel 121, or an image in the camera unit 141 may be used as one of instruction inputs through the operation panel 122. Further, when detecting a position using the GPS receiver unit 170, the position may be detected with reference to an image from the camera unit 141. In addition, it is possible to determine an optical axis direction or a current usage environment of the camera unit 141 of the smartphone 101 without using a triaxial acceleration sensor or by using the triaxial acceleration sensor together, with reference to the image from the camera unit 141. Furthermore, the image from the camera unit 141 may be used in the application software.

Furthermore, position information acquired by the GPS receiver unit 170, voice information (which may be text information obtained by performing voice text conversion by the main controller or the like) acquired by the microphone 132, posture information acquired by the motion sensor unit 180, or the like may be added to image data on a still image or a moving image, and the result may be recorded in the storage unit 150, or may be output through the external input/output unit 160 or the wireless communication unit 110.

The above-described image generation unit 36, scene analysis unit 37, image correction unit 39, display controller 42, focus controller 34, and the like (see FIG. 11) may be realized by the main controller 100, for example. The above-described focus adjustment unit 32 or the like (see FIG. 11) may be realized by the camera unit 141, for example.

What is claimed is:

1. An imaging device comprising:
    an imaging optical system that includes a first optical system and a second optical system having independent characteristics;
    an imaging element that includes a plurality of light-receiving sensors which are provided corresponding to each of the first optical system and the second optical system and pupil-split light passed through a corresponding optical system among the first optical system and the second optical system to selectively receive the light;
    a processor including an image generator that generates a first captured image from an imaging signal output from the light-receiving sensors corresponding to the first optical system and generates a second captured image from an imaging signal output from the light-receiving sensors corresponding to the second optical system;
    a focus adjustment unit including a plurality of actuators that adjust a focus state of each of the first optical system and the second optical system in an independent manner; and
    a focus controller that acquires importance degree information indicating the degrees of importance of the first captured image and the second captured image and controls the plurality of actuators based on the importance degree information.

2. The imaging device according to claim 1,
    wherein the focus controller controls the plurality of actuators so that the second optical system enters a defocus state in a case where the importance degree information indicates that the degree of importance of the first captured image is higher than that of the second captured image, and controls the plurality of actuators so that the first optical system enters a defocus state in a case where the importance degree information indicates that the degree of importance of the second captured image is higher than that of the first captured image.

3. The imaging device according to claim 2,
    wherein the defocus state of the first optical system is realized when a full width at half maximum of a point spread function of the first optical system becomes equal to or greater than a pixel pitch of the plurality of light-receiving sensors by controlling the plurality of actuators by the focus controller, and
    wherein the defocus state of the second optical system is realized when a full width at half maximum of a point spread function of the second optical system becomes equal to or greater than the pixel pitch of the plurality of light-receiving sensors by controlling the plurality of actuators by the focus controller.

4. The imaging device according to claim 1, further comprising:
    a user interface,
    wherein the focus controller acquires the importance degree information based on input to the user interface.

5. The imaging device according to claim 1, the processor further comprising:
    a scene analyzer that analyzes an imaging scene,
    wherein the focus controller acquires the importance degree information based on an analysis result in the scene analyzer.

6. The imaging device according to claim 5,
    wherein the scene analyzer detects a tracking target in the imaging scene based on at least one of the first captured image or the second captured image and analyzes a temporal behavior of the tracking target, and
    wherein the focus controller acquires the importance degree information based on the temporal behavior of the tracking target analyzed by the scene analyzer.

7. The imaging device according to claim 1, the processor further comprising:
    an image corrector that performs correction of the first captured image and the second captured image to reduce the influence of light passed through the second optical system in the first captured image and to reduce the influence of light passed through the first optical system in the second captured image.

8. The imaging device according to claim 7,
    wherein the image corrector performs the correction based on an inverse matrix of a matrix formed by detection gain distributions and radio interference gain distributions of the first captured image and the second captured image.

9. The imaging device according to claim 1,
    wherein the first optical system and the second optical system are different from each other in at least one of focal distances or focusing distances thereof.

10. The imaging device according to claim 1,
    wherein the second optical system is provided in a peripheral region of the first optical system, and has the same optical axis as that of the first optical system.

11. The imaging device according to claim 1,
wherein among a plurality of regions of the imaging optical system which are integrally provided, a first region is configured by the first optical system, and a second region is configured by the second optical system.

12. An imaging method in an imaging device including an imaging optical system that includes a first optical system and a second optical system having independent characteristics, an imaging element that includes a plurality of light-receiving sensors which are provided corresponding to each of the first optical system and the second optical system and pupil-split light passed through a corresponding optical system among the first optical system and the second optical system to selectively receive the light, an image generation unit that generates a first captured image from an imaging signal output from the light-receiving sensors corresponding to the first optical system and generates a second captured image from an imaging signal output from the light-receiving sensors corresponding to the second optical system, and a focus adjustment unit that adjusts a focus state of each of the first optical system and the second optical system in an independent manner, the method comprising:
- a step of acquiring importance degree information indicating the degrees of importance of the first captured image and the second captured image; and
- a step of controlling the focus adjustment unit based on the importance degree information.

* * * * *